US012563392B2

(12) United States Patent
De Kievit et al.

(10) Patent No.: US 12,563,392 B2
(45) Date of Patent: Feb. 24, 2026

(54) APPARATUS AND METHOD

(71) Applicant: NEC Corporation, Tokyo (JP)

(72) Inventors: Sander De Kievit, Tokyo (JP); Anand Raghawa Prasad, Tokyo (JP); Sheeba Backia Mary Baskaran, Tamil Nadu (IN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/631,247

(22) Filed: Apr. 10, 2024

(65) Prior Publication Data

US 2024/0259803 A1 Aug. 1, 2024

Related U.S. Application Data

(63) Continuation of application No. 17/288,995, filed as application No. PCT/JP2019/043451 on Nov. 6, 2019, now Pat. No. 11,991,518.

(51) Int. Cl.
*H04W 12/72* (2021.01)
*H04W 8/18* (2009.01)
*H04W 12/06* (2021.01)

(52) U.S. Cl.
CPC ............ *H04W 12/06* (2013.01); *H04W 8/18* (2013.01); *H04W 12/72* (2021.01)

(58) Field of Classification Search
None
See application file for complete search history.

(56) References Cited

U.S. PATENT DOCUMENTS

2008/0076392 A1* 3/2008 Khetawat .......... H04W 12/0431 455/411
2020/0112906 A1* 4/2020 Chaponniere ....... H04W 40/248
2021/0160691 A1* 5/2021 Liu ..................... H04W 12/037
2021/0258797 A1* 8/2021 Chandramouli ........ H04W 8/26
2022/0060325 A1 2/2022 Castellanos Zamora .................... H04L 67/63

OTHER PUBLICATIONS

International Search Report for PCT Application No. PCT/JP2019/043451, mailed on Jan. 14, 2020.
3rd Generation Partnership Project, "Technical Specification Group Services and System Aspects; Vocabulary for 3GPP Specifications (Release 15)", 3GPP TR 21.905 V15.0.0, pp. 1-66, Mar. 2018.
3rd Generation Partnership Project, "Technical Specification Group Services and System Aspects; Security architecture and procedures for 5G system (Release 15)", 3GPP TS 33.501 V15.2.0, pp. 1-176, Sep. 2018.
3rd Generation Partnership Project, "Reply LS on Routing ID", 3GPP S3-183074, 3GPP TSG SA WG3 (Security) Meeting #92 ad-hoc, Harbin, China, Sep. 24-28, 2018.

(Continued)

*Primary Examiner* — Nelson S. Giddins

(57) ABSTRACT

An apparatus is provided. The apparatus includes a memory storing one or more instructions and a processor. The processor execute the one or more instructions to: receive update information from an external apparatus, the update information corresponding to a network communication; obtain a Subscription Concealed Identifier (SUCI) based on the update information; and transmit the SUCI to the external apparatus.

21 Claims, 18 Drawing Sheets

(56) References Cited

OTHER PUBLICATIONS

Qualcomm et al., "Update of Default Configured NSSAI and other UE parameters via Control Plane Solution from UDM to AMF with Direct NAS Transport to UE", 3GPP S2-1811541, 3GPP SA WG2 Meeting #S2-129, Dongguan, P.R. China, Oct. 15-19, 2018.
Qualcomm Incorporated, "Update of Routing ID in the UE", 3GPP S2-1810060, 3GPP SA WG2 Meeting #129, Dongguan, P.R. China, pp. 1-5, Oct. 15-19, 2018.
Nokia et al., "Providing Routing ID update via DL NAS Transport procedure", 3GPP C1-186093, 3GPP TSG-CT WG1 Meeting #112bis, Vilnius, Lithuania, Oct. 15-19, 2018.
Nokia et al., "LI compliance when applying subscriber identifier privacy", 3GPP S3-173124, 3GPP TSG SA WG3 (Security) Meeting #89, Reno, US, Nov. 27-Dec. 1, 2017.
3rd Generation Partnership Project, "Technical Specification Group Services and System Aspects; Security architecture and procedures for 5G system (Release 15)", 3GPP TS 33.501 V15.1.0, pp. 1-152, Jun. 2018.
JP Office Action for JP Application No. 2021-521549, mailed on May 17, 2022 with English Translation.
Nokia, Orange, T-Mobile USA, "Li compliance when applying subscriber identifier privacy",3GPP TSG SA WG3 #90 S3-180083, 3GPP, Jan. 15, 2018.
Nokia, Nokia Shanghai Bell, "Comments to LS on Routing ID", CP-182238, 3GPP TSG SA WG3 #92Bis S3-183050, 3GPP, Sep. 19, 2018.
Nokia,"SIDF purpose in initiation of authentication", 3GPP TSG SA WG3#88Bis S3-172355, 3GPP, Oct. 2, 2017.
Nokia, "Discussion on LI conformity by verification hash method", 3GPP TSG SA WG3 #90Bis S3-180768, 3GPP, Feb. 19, 2018.
JP Office Action for JP Application No. 2022-175180, mailed on Aug. 22, 2023 with English Translation.
Nokia et al,"Discussion on Routing ID Update Solutions", 3GPP TSG-CT WG1#112bis C1-186089, Oct. 8, 2018, pp. 1-pp. 20.
Qualcomm Incorporated,"Evaluation of solutions for Routing ID update", 3GPP TSG-CT WG1#112bis C1-186239, Oct. 8, 2018, pp. 1-pp. 5.
NEC,"Transmission mechanism of SUCI in NAS procedure", 3GPP TSG-CT WG1#112 C1-185317, Jan. 13, 2018, pp. 1.-pp. 8.

* cited by examiner

USIM

| Priority | RoutingID | HN KID | HN Key | Scheme | ··· |
|---|---|---|---|---|---|
| 1 | A | ID1 | K1 | 1 | ··· |
| 2 | A | ID2 | K2 | 1 | ··· |
| ··· | ··· | ··· | ··· | ··· | ··· |

UE

UDM2

UDM1

Scenario 2

Migrate subscription to UDM2

New UDM1 initiates data update procerure

APPARATUS AND METHOD

This application is a continuation application of U.S. patent application Ser. No. 17/288,995 filed on Apr. 27, 2021, which is a National Stage Entry of PCT/JP2019/043451 filed on Nov. 6, 2019, which claims priority from Indian Patent Application 201811041964 filed on Nov. 6, 2018, the contents of all of which are incorporated herein by reference, in their entirety.

TECHNICAL FIELD

The present disclosure relates to apparatus and method in a communication system.

BACKGROUND ART

In 5G mobile networks, a new protection mechanism is introduced that prevents an attacker from sniffing the permanent identifier on the air interface. Mobile devices (also known as UEs) that use this feature use a public key to encrypt their permanent identifier (known as SUPI) and send the encrypted identifier (known as SUCI) to the network. Mobile networks are typically interconnected and it is a common occurrence that a mobile device attaches to a second mobile network that is not the one where the subscription is held. In such a case, the mobile device is said to be roaming in a visited network or visited PLMN, VPLMN. As such, in order to decrypt the SUCI, the SUCI needs to be send to the home network or home PLMN, HPLMN, where the mobile device holds the subscription.

In order to be able to route the encrypted identifier to the correct network and subscriber database (known as UDM) inside the second network, the mobile device prepends or appends routing data to the SUCI, such as a mobile country code (MCC), mobile network code (MNC), and a routing identifier (RoutingID) and the home network public key identifier. The MCC and MNC together allow the visited network that received the SUCI to route the SUCI to a home network and the RoutingID is used by the home network to locate the UDM instance inside the home network. Finally, the home network public key identifier is used to lookup the corresponding private key which is used to decrypt the SUCI. The last action is commonly executed by the SUCI de-concealing function or SIDF.

CITATION LIST

Non Patent Literature

NPL 1: 3GPP TR 21.905: "Vocabulary for 3GPP Specifications". V15.0.0 (March 2018)
NPL 2: 3GPP TS 33.501: "Security architecture and procedures for 5G system" V15.2.0 (September 2018)
NPL 3: S3-183074—Reply LS on RoutingID
NPL 4: S2-1810060, Update of Routing ID in the UE, 2018 Oct. 15
NPL 5: S2-1811541, Update of Default Configured NSSAI and other UE parameters via Control Plane Solution from UDM to AMF with Direct NAS Transport to UE, 2018 Oct. 15

SUMMARY OF INVENTION

Technical Problem

Incorrectness of the MNC/MCC, RoutingID would lead to the SUCI being routed to the wrong network or entity inside the home network respectively and subsequently not being decrypted. Errors in the home network public key identifier would lead to the SIDF not being able to decrypt the SUCI, because the SIDF cannot find the corresponding private key, or finds the wrong key. Similarly, errors in the home network public key would lead to the UE using an erroneous public key to encrypt the SUPI and errors in the protection scheme would lead to the UE using the wrong protection scheme. For both cases, the receiving SIDF would not be able to decrypt.

The error cases described in the previous paragraph are not recoverable because they are necessary to obtain access to the network. Without these parameters or with corrupted parameters, access to the network is not possible because the SUCI cannot be routed to the correct entity or cannot be decrypted. In order to prevent corruption of these parameters, they are commonly stored in a secure read-only storage called a universal integrated circuit card, UICC, or an embedded UICC, eUICC, so that the aforementioned errors can be prevented.

Recently, however, the 3GPP SA2 working group has considered that there is a need for updating the RoutingID in case the subscription data is migrated from one UDM instance to another (see NPL4, NPL5). This newly introduced need means that the RoutingID has to be stored in a read/write memory and as such becomes vulnerable to attack by an attacker. Furthermore, in the future, a need may arise to also update the home network public key, the home network public key identifier, and protection scheme or other attach critical data stored on the universal subscriber identity module, USIM. Because these parameters are critical for attaching to the network, a robust security mechanism needs to be in place.

In view of the problems described above, the present disclosure aims to provide a solution to solve at least one of the various problems.

Solution to Problem

In a first aspect, the present disclosure provides an apparatus. The apparatus includes a memory storing one or more instructions; and a processor configured to execute the one or more instructions to: receive update information from an external apparatus, the update information corresponding to a network communication; obtain a Subscription Concealed Identifier (SUCI) based on the update information; and transmit the SUCI to the external apparatus.

In a second aspect, the present disclosure provides an apparatus. The apparatus includes a memory storing one or more instructions; and a processor configured to execute the one or more instructions to: transmit update information to an external apparatus, the update information corresponding to a network communication; receive a Subscription Concealed Identifier (SUCI) from the external apparatus, the SUCI being obtained based on the update information; obtain a Subscription Permanent Identifier (SUPI) based on the received SUCI; and verify whether the SUPI corresponds to the update information.

In a third aspect, the present disclosure provides a method. The method includes: receiving update information from an external apparatus, the update information corresponding to a network communication; obtaining a Subscription Concealed Identifier (SUCI) based on the update information; and transmitting the SUCI to the external apparatus.

In a fourth aspect, the present disclosure provides a method. The method includes: transmitting update information to an external apparatus, the update information corresponding to a network communication; receiving a Subscription Concealed Identifier (SUCI) from the external apparatus, the SUCI being obtained based on the update information; obtaining a Subscription Permanent Identifier (SUPI) based on the received SUCI; and verifying whether the SUPI corresponds to the update information.

DESCRIPTION OF EMBODIMENTS

Figure 1:
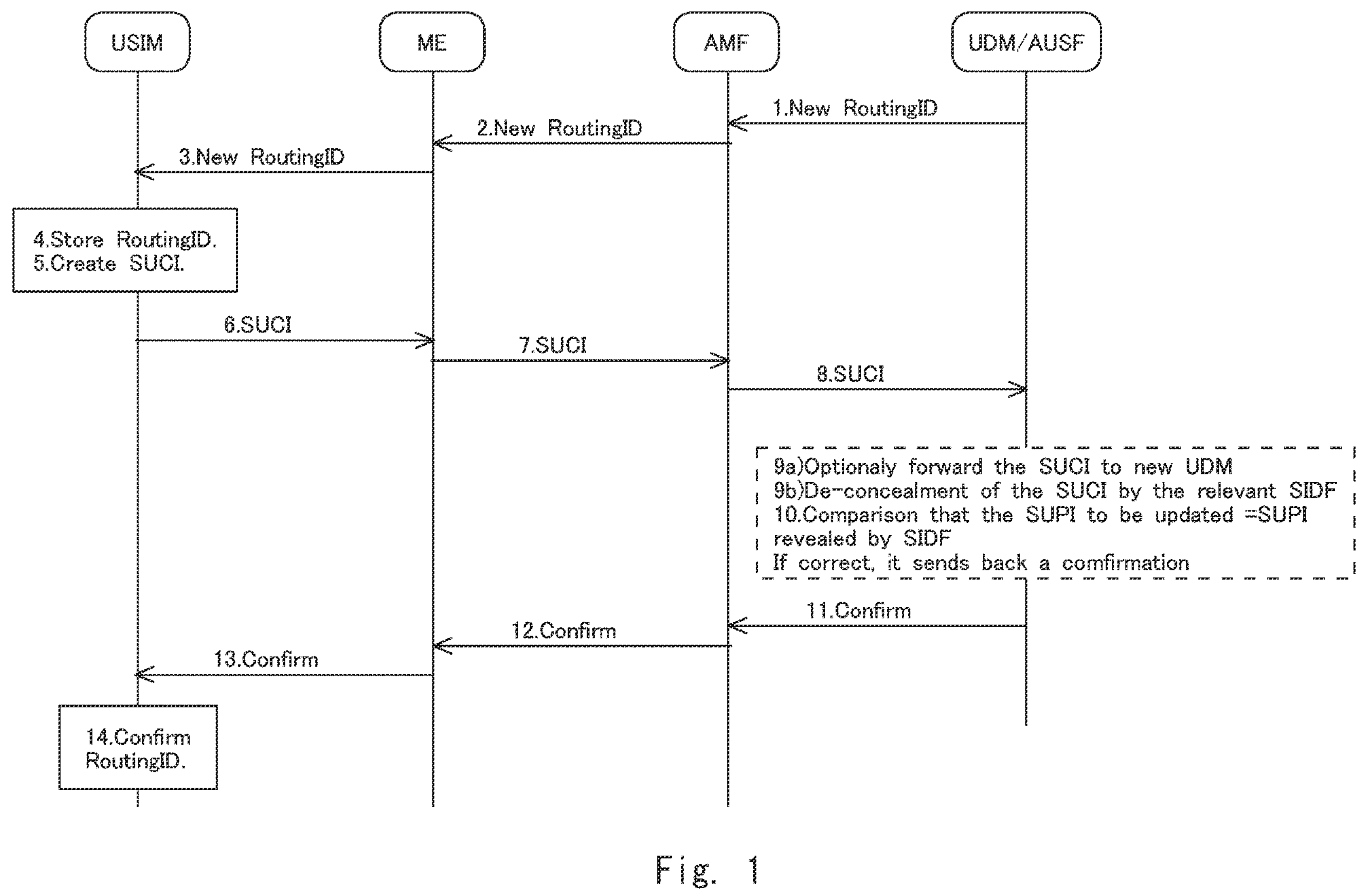
FIG. 1 is a sequence chart showing a method for confirming the correctness of the parameters after the parameters have been updated according to a first embodiment of the present disclosure.

For the purposes of the present document, the abbreviations given in NPL1 and the following are applied. An abbreviation defined in the present document takes precedence over the definition of the same abbreviation, if any, in NPL1.

| | |
|---|---|
| 5GC | 5G Core Network |
| 5GS | 5G System |
| 5G-AN | 5G Access Network |
| 5G-GUTI | 5G Globally Unique Temporary Identifier |
| 5G S-TMSI | 5G S-Temporary Mobile Subscription Identifier |
| 5G (Home)BSF | 5G (Home) Boot Strapping Function |
| AMF | Access and Mobility Management Function |
| AN | Access Node |
| AKMA | Authentication and Key Management for Applications |
| AS | Access Stratum |
| AUSF | Authentication Server Function |
| CP | Control Plane |
| CM | Connection Management |
| DL | Downlink |
| DN | Data Network |
| DNAI | DN Access Identifier |
| DNN | Data Network Name |
| EPS | Evolved Packet System |
| EPC | Evolved Packet Core |
| FQDN | Fully Qualified Domain Name |
| GPSI | Generic Public Subscription Identifier |
| GUAMI | Globally Unique AMF Identifier |
| HR | Home Routed (roaming) |
| I-RNTI | I-Radio Network Temporary Identifier |
| KDF | Key Derivation Function |
| LADN | Local Area Data Network |
| LBO | Local Break Out (roaming) |
| LMF | Location Management Function |
| LRF | Location Retrieval Function |
| MAC | Medium Access Control |
| ME | Mobile Equipment |
| MFBR | Maximum Flow Bit Rate |
| MICO | Mobile Initiated Connection Only |
| MME | Mobility Management Entity |
| N3IWF | Non-3GPP Inter Working Function |
| NAI | Network Access Identifier |
| NAS | Non-Access Stratum |
| NEF | Network Exposure Function |
| NF | Network Function |
| NG-RAN | Next Generation Radio Access Network |
| NR | New Radio |
| NRF | Network Repository Function |
| NSI ID | Network Slice Instance Identifier |
| NSSAI | Network Slice Selection Assistance Information |
| NSSF | Network Slice Selection Function |
| NSSP | Network Slice Selection Policy |
| PCF | Policy Control Function |
| PEI | Permanent Equipment Identifier |
| PER | Packet Error Rate |
| PFD | Packet Flow Description |
| PLMN | Public land mobile network |
| PPD | Paging Policy Differentiation |
| PPI | Paging Policy Indicator |
| PSA | PDU Session Anchor |
| QFI | QoS Flow Identifier |
| QoE | Quality of Experience |
| (R)AN | (Radio) Access Network |
| RLC | Radio Link Control |
| RM | Registration Management |
| RQA | Reflective QoS Attribute |
| RQI | Reflective QoS Indication |
| RRC | Radio Resource Control |
| SA NR | Standalone New Radio |
| SBA | Service Based Architecture |
| SBI | Service Based Interface |
| SD | Slice Differentiator |
| SDAP | Service Data Adaptation Protocol |
| SEAF | Security Anchor Functionality |
| SEPP | Security Edge Protection Proxy |
| SMF | Session Management Function |
| S-NSSAI | Single Network Slice Selection Assistance Information |
| SSC | Session and Service Continuity |
| SST | Slice/Service Type |

-continued

| | |
|---|---|
| SUCI | Subscription Concealed Identifier |
| SUPI | Subscription Permanent Identifier |
| UDSF | Unstructured Data Storage Function |
| UL | Uplink |
| UL CL | Uplink Classifier |
| UPF | User Plane Function |
| UDR | Unified Data Repository |
| URSP | UE Route Selection Policy |
| USIM | Universal Subscriber Identity Module |
| SMS | Short Message Service |
| SMSF | SMS Function |
| SQN | Sequence number |
| MT | Mobile Terminated |

For the purposes of the present document, the terms and definitions given in NPL1 and the following apply. A term defined in the present document takes precedence over the definition of the same term, if any, in NPL1.

As described, 3GPP SA2 has discussed the need to update of the RoutingID in the USIM in order for a mobile operator to be able to move the subscription from one UDM to another UDM. This disclosure in addition considers the update of other parameters, such as home network public key as well. Although the mechanism may seem similar, there are slight differences.

Figures 16A, 16B:
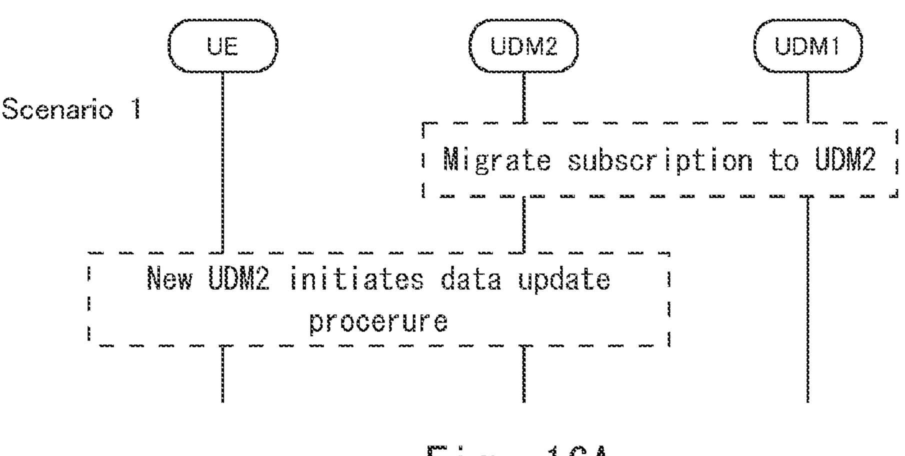
FIG. 16A is sequence chart showing a first update scenario.
FIG. 16B is sequence chart showing a second update scenario.
Figure 16C:
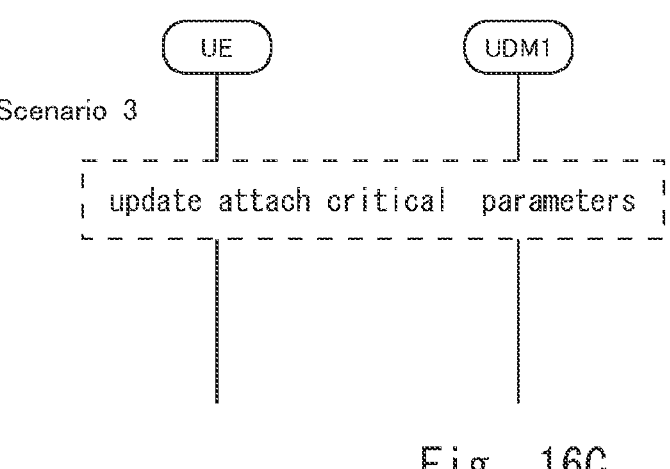
FIG. 16C is sequence chart showing a third update scenario.

FIGS. 16A to 16C show three possible update scenarios. As shown in FIG. 16A, the first update scenario is the one where the target UDM (UDM2), to which the subscription is to be moved, initiates the update procedure with the UE by sending the UE an instruction to update the RoutingID after having received the new subscription information. As shown in FIG. 16B, the second update scenario is the one where the source UDM (UDM1), from which the subscription data is to be removed, initiates the update procedure. As it was observed, moving the subscription information between two UDMs is a reason to update the RoutingID and hence the update procedure will have to be run.

As shown in FIG. 16C, the last scenario is slightly different, though, in that the subscription information is not moved from one UDM to another UDM. Such a scenario could be used for updating other parameters, like the home network public key together with the home network public key identifier and protection scheme. Other scenarios where such a procedure is run is, for example, when steering of roaming is used. Steering of roaming is applied by the home operator to move the UE from one visited network to another visited network. In such a case, the UDM sends a list of roaming partners with the aim to steer the UE to the desired network.

Figure 17:
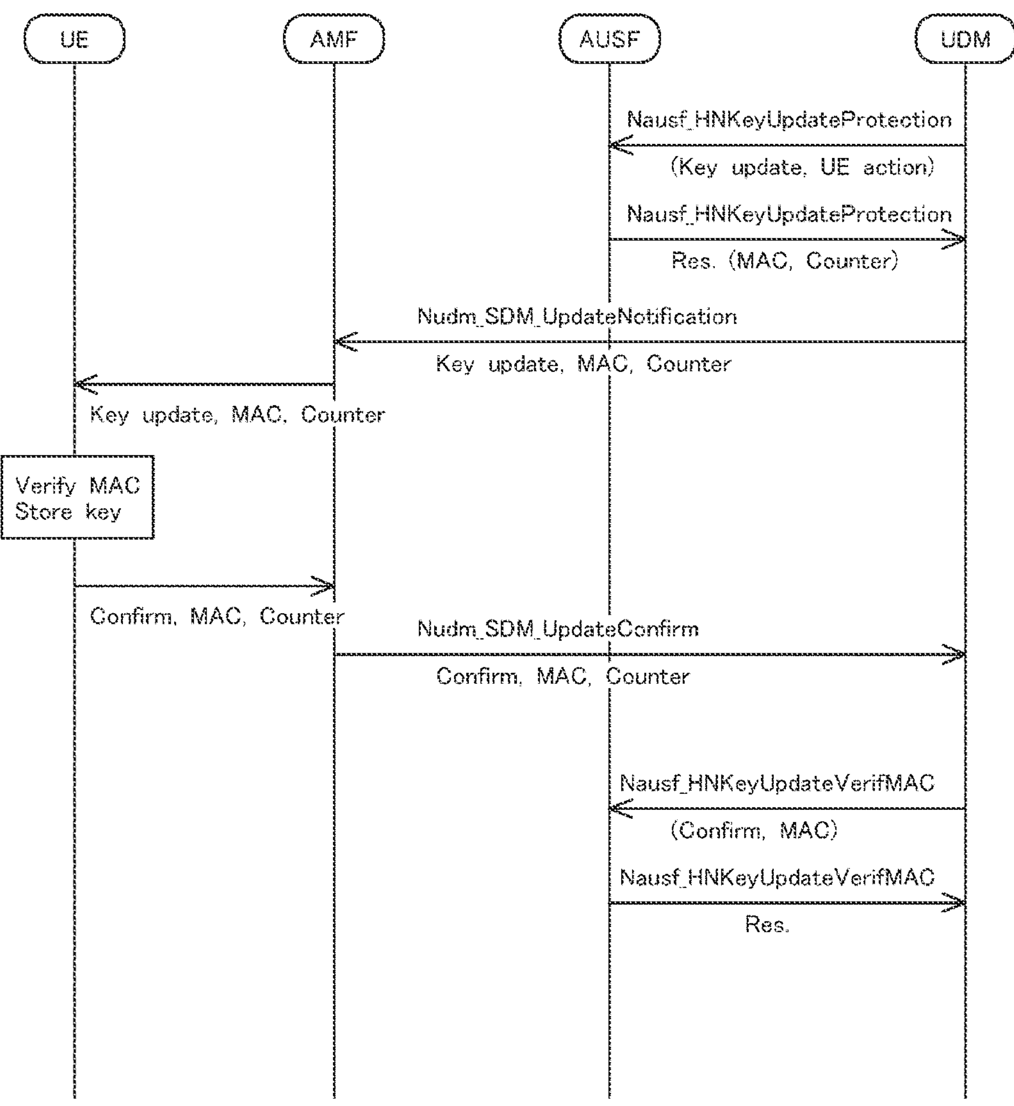
FIG. 17 is a sequence chart showing a mechanism for updating parameter.

For steering of roaming, a security solution exists as described in NPL2. This solution could be adapted for the update of the RoutingID or key update as described in NPL3 and shown in FIG. 17. This solution would provide a mechanism to securely send data between the AUSF, an entity in the home network, and the mobile equipment, ME, based on a secret key stored in the AUSF and the ME. The secret key stored in the KAUSF is the result of a successful authentication and key agreement run which would generally be executed by the mobile device and the home network after the mobile device has requested access to a network. This key is therefore only available once a UE has successfully authenticated and cannot be used after a UE has detached from the serving network.

In more detail, such a solution would work as follows. The UDM prepares a message for an attach related parameter update (in FIG. 17, a key update is shown as an example) and sends it to the AUSF. The AUSF creates a MAC using a key derivation function (KDF) and calculates the MAC as follows:

$$MAC = KDF(K_{AUSF}, \text{“Attach Parameter Update”, Counter, message}),$$

Where the $K_{AUSF}$ is the input key to the key derivation function, the “Attach Parameter Update” is a text field stating that this MAC is calculated for the attach parameter update procedure. The text field could assume different values, but will always be fixed for the procedure that is followed. The text field is a fixed value for the method. The Counter is used to avoid key repetition and is augmented with every attach related parameter update message. The message is the plain text message from the UDM. Additionally, also other values could be added to the KDF.

In the next step, the AUSF returns the MAC and the counter. The UDM sends the MAC, counter and message to the AMF, which forwards it using a NAS DL transport message to the UE. When the UE receives the message, the UE will calculate the MAC from the plain text message, the counter, the text field and the $K_{AUSF}$ (XMAC=KDF ($K_{AUSF}$, “Attach Parameter Update”, Counter, message)) and store the key if the XMAC matches the MAC.

Then, if the network has asked for a confirmation, the UE will send a confirmation message stating that the UE has received the key. In order to protect, the UE will use a similar calculation, namely:

$$MAC = KDF(K_{AUSF}, \text{“Attach Parameter Update”, Counter, message}),$$

Where the counter is augmented with 1 compared to the counter the UE received, and the message is the plaintext message that the UE sends to the network. The UE will send the confirmation, the MAC and the counter to the AMF, which will forward it to the UDM. Upon reception, the UDM will forward the message, the MAC and the counter to the AUSF so that the AUSF can verify the MAC.

Variations to the above could be made. For example, one could derive a specific key from the $K_{AUSF}$ for this method and use a different integrity protection mechanism. However, it is noted though that such a $K_{AUSF}$-based solution would only protect the message exchange between the ME and the AUSF. As commented in NPL3, using such a mechanism where the ME is allowed to update the files leaves the files vulnerable to attack. Hence, the mechanism based on protecting between the UDM and the ME using a secret key is insufficient to deal with this problem as it would only protect the communication and does not provide certainty that the correct data has been written to the secure storage and can be retrieved correctly.

In NPL3, two more solutions are described. In particular, a solution is described where the USIM could switch between multiple pre-stored values in the USIM. This mechanism relies on the AUTHENTICATE command to switch the data set to be used by the USIM for the next attach. In return, the USIM could add an encrypted part to the SUCI so that the UDM would know that the message was received by the USIM. This solution, however, is lacking a confirmation from the USIM to the UDM, thereby lacking a way for the UDM to know whether the attach critical parameters are correctly stored before issuing a command to the USIM to switch. As such, the UE could still be left without service even after switching the attach critical parameter set.

Considering the above, the inventors have recognized a need for confirming that the correct parameters are stored in the secure storage after updating these and that the mobile device will be able to attach to the network after detaching from the network.

First Embodiment

FIG. 1 shows a method for confirming the correctness of the attach related parameters, such as RoutingID, after these parameters have been updated according to a first embodiment of the present disclosure. FIG. 1 uses RoutingID as an example, but the methods equally can be applied after an update of the home network public key, home network public key identifier, protection scheme, etc. In following description, the RoutingID is understood to only be an example of any of these parameters.

As shown in FIG. 1, in Step 1, the UDM sends a new RoutingID for the UE including a ME and a USIM to the AMF in the serving network. If the UDM would like to send this information during registration, the UDM could send the RoutingID in the SDM_Get_Response message in response to the AMF's Nudm_SDM_Get request. If the UDM would like to send this information while the UE is attached, it could use the SDM_UpdateNotification to inform the AMF that the data has to be forwarded to the UE. It is possible to also integrity protect this message according to the method described in NPL2 for steering of roaming or as explained in FIG. 17. If that method is used, the RoutingID will have related security parameters, amongst others a MAC-I which can be used by the ME to verify the integrity of the RoutingID.

In Step 2, the AMF will forward the new RoutingID (and other relevant parameters, such as a MAC-I if the RoutingID is integrity protected) to the UE using a DL NAS transport message. The UE will, after having received the DL NAS transport message, verify whether the MAC-I is correct (if present). If so, the UE will store the new RoutingID in the USIM in Step 4.

In Step 5, the USIM constructs a fresh SUCI using the home network public key, the MCC/MNC, and the newly stored RoutingID. In Step 6, the USIM sends the new SUCI to the ME, and the ME sends the new SUCI in a UL NAS transport message to the AMF in Step 7. The ME may also integrity protect this message between the ME and the AUSF using the method described in FIG. 17. In that case, the UL NAS transport message will also contain security related parameters which allow the AUSF to verify that the message arrived unchanged at the AUSF.

After having received the UL NAS transport message, the AMF forwards the SUCI and the related security parameters (if include) to the UDM using a Nudm_SDM_Info message in Step 8. If security parameters are included, the UDM will send the message to the AUSF for verification according to NPL1. If the message verified correctly, the UDM will check whether the value of the RoutingID is correct or not.

Figure 2A:
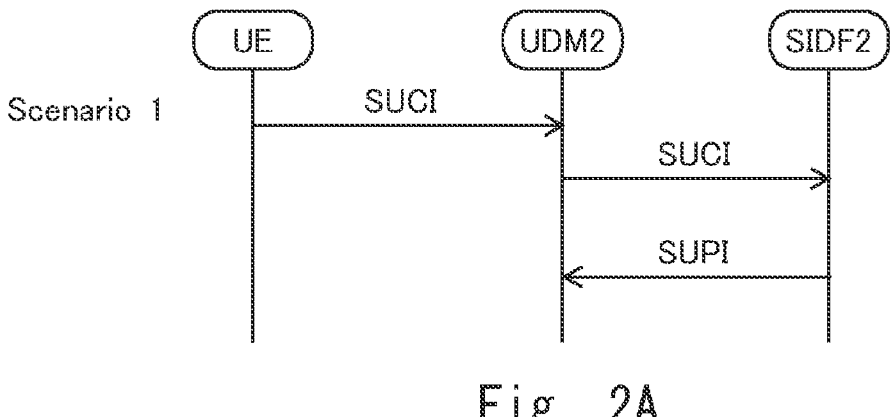
FIG. 2A is a sequence chart showing a first scenario in which the SUCI is confirmed.
Figure 2B:
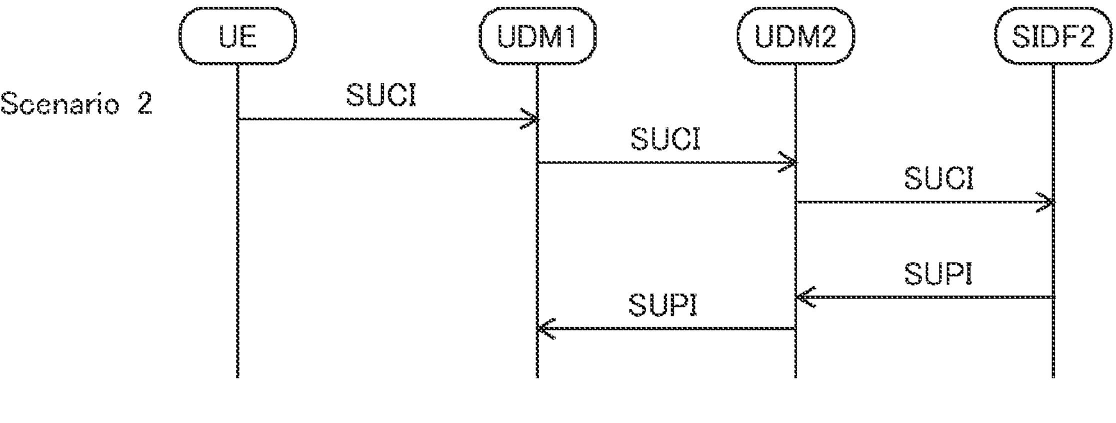
FIG. 2B is a sequence chart showing a second scenario in which the SUCI is confirmed.
Figure 2C:
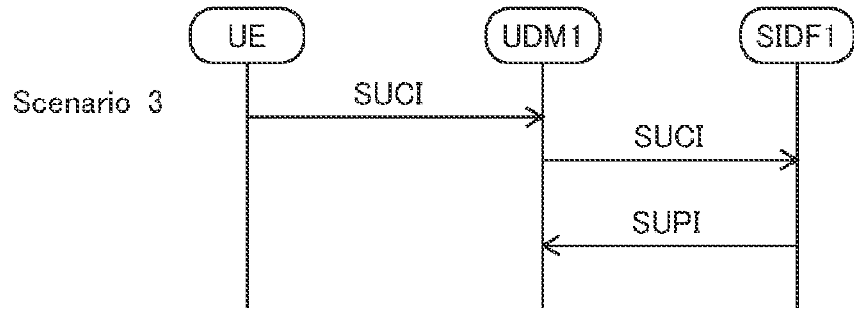
FIG. 2C is a sequence chart showing a third scenario in which the SUCI is confirmed.

The way the UDM performs the above check depends on how the RoutingID was received. FIGS. 2A to 2C show scenarios in which the SUCI is confirmed. FIG. 2A shows a first scenario. In the first scenario, the RoutingID update procedure is performed by the UDM2 to which the subscription is moved and hence the UDM2 can check the RoutingID locally. As shown in FIG. 2A, the UDM2 receives the SUCI (as an example, the UDM2 could also receive the RoutingID), the SUCI being forwarded to the SIDF2 and the SUPI being returned to the UDM2. The UDM2 can now check that the SUPI corresponds to the SUPI that it has just received the update confirmation message containing the SUCI from.

FIG. 2B shows a second scenario. In the case of the second scenario, the UDM receiving the attach update parameter confirmation message is not the same as the UDM to which the new subscription is moved. In such a case, the UDM1 would, after receiving the SUCI in the attach update parameter confirmation message, forward the SUCI to the UDM2. The UDM2 in turn would forward the SUCI to the SIDF2 belonging to the UDM2. As shown in FIG. 2B, the SIDF2 returns the SUPI to the UDM2. The UDM2 forwards the SUPI to UDM1 where the comparison as in the first scenario is performed.

FIG. 2C shows a third scenario. For the third scenario, there is no change in where the subscription is stored and as can be seen from FIG. 2C, this case is similar to the first scenario. The UDM1 receives the attach update parameter confirmation message from the UE, extracts the SUCI and forwards the SUCI to the SIDF1. The SIDF1 de-conceals the SUCI and returns the SUPI to the UDM1 for comparison.

In any of the cases, if the comparison result at the UDM that received the attach parameter update confirmation message is successful, the UDM has verified that the RoutingID is stored correctly in the USIM. An error occurs, for example, because the SIDF cannot de-conceal the SUCI, or because the RoutingID points to the wrong or non-existing UDM, and the UDM that received the attach parameter update confirmation message can conclude that the update has failed. In such a case, a failure would have to be reported back to the UE and/or recovery procedures would have to be started. The handling of failure cases is described later.

In the above, the SUCI is de-concealed using the SIDF. This is particularly advantageous in a case in which the home network key would be updated instead of the RoutingID. In a case in which the home network public key is updated and the SIDF can de-conceal the SUPI from a SUCI that is encrypted with the new home network public key, the UDM has verified that the newly provisioned home network public key is correctly stored in the USIM.

In Step 5, the UE performs an asymmetric encryption by encrypting the SUPI with the home network public key. Instead of the SUPI, the UE could also encrypt only the updated parameter, RoutingID in this case, or concatenate the RoutingID and the SUPI in the same message. This provides additional assurance over the correctness of the RoutingID, in particular if the SUCI is calculated in the USIM and not in the ME. In such cases, in FIGS. 2A to 2C, all instances of SUPI would be replaced by RoutingID and all instances of SUCI would be replaced by "Encrypted RoutingID".

The messages in Steps 11-13 in FIG. 1 are a set of confirmation messages from the UDM back to the UE to confirm that the correct information has been received by the UDM. These messages follow the same path as the messages in Steps 1-3. The UDM sends the confirmation message to the AMF using the SDM_UpdateNotification to inform the AMF that the data has to be forwarded to the UE in Step 11. Like the message in Step 1, it is possible to also integrity protect the confirmation message according to the method described in NPL2 for steering of roaming. If that method is used, additional security parameters will have to be included. The AMF will forward the confirmation message to the UE using a DL NAS transport message in Step 12. The ME will, after having received the DL NAS transport message, verify whether the MAC-I is correct (if present). If so, the ME will forward the confirmation message to the USIM in Step 13.

The confirmation itself can include a simple binary value saying 'correct' or '1' indicating that the situation is correct. Additionally, the home network can integrity protect the message using the home network private key corresponding to the home network public key that is stored in the USIM. This way, the USIM can verify that the network has sent the confirmation.

The confirmation message as described in the previous paragraph can however be replayed to another USIM. If that is to be prevented, the confirmation message could in addition contain the SUCI that was received by the UDM so that the SUCI that was created by the USIM and the confirmation that was returned by the UDM are bound together. This would require, though, that, in Step 5, the USIM stores the SUCI that the USIM constructed until the USIM receives the confirmation message. When USIM receives the confirmation message, the USIM will verify whether the message is integrity protected well and also verify that the SUCI contained in the confirmation message is the same as that the USIM has stored.

The advantage of such a confirmation message is that the USIM and the UDM both confirm that the attach critical parameters that both have stored is correct and verified. After the USIM has confirmed the message, the USIM can permanently store the new attach parameters and use these parameters for a subsequent attach.

As described when describing FIGS. 2A to 2C, failures may occur. For example, the UE may not have stored the correct home network key or may have stored the wrong RoutingID. In such cases, the verification by the UDM as described in FIGS. 2A to 2C will show an error. Another failure may occur when the confirmation message from the UDM back to the UE (Steps 11-13 in FIG. 1) gets lost. In such a case, the UE would have to go through recovery procedures to find out whether the new attach critical parameters are correct.

Figure 3:
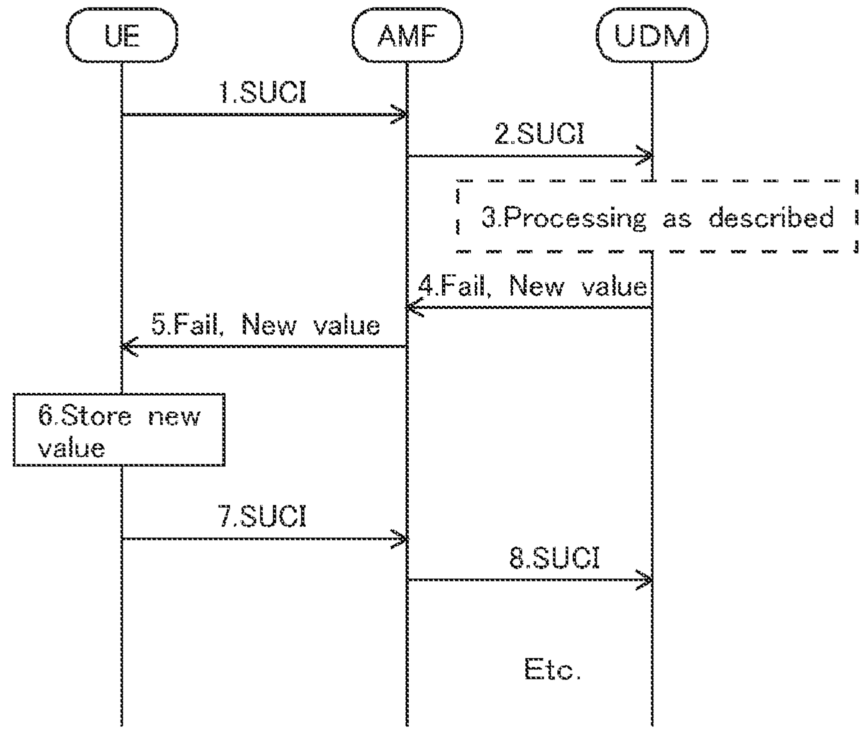
FIG. 3 is a sequence chart showing a way to handle a failure case.

FIG. 3 shows a way to handle a failure case. Steps 1 and 2 in FIG. 3 correspond to Steps 6-8 in FIG. 1. The difference is that the USIM and the ME are considered as one in FIG. 3 and using the term "UE" for the combination. In Step 3, the attach parameter update confirmation message is processed at the UDM as described in the explanatory text in FIG. 1 and when doing so, an error is revealed. For example, when the RoutingID is incorrect, the SUCI cannot be de-concealed, or an incorrect value results from the SUCI de-concealment. After Step 3, the UDM understands that the update has failed and sends a message to the UE via the AMF in Steps 4 and 5, for providing the UE with the correct values and stating that a failure has occurred. The messages in Steps 4 and 5 are analogous to the messages in Steps 1-3 in FIG. 1. Upon reception, the UE may again verify the message, store the new values in Step 6. Step 6 in FIG. 3 corresponds to Steps 4 and 5 in figure FIG. 1. The UE may again send a "attach parameter update confirmation" message back to the UDM via the AMF for verification in Steps 7 and 8. The UDM again verifies whether everything is correct. If the verification is not successful, the process repeats from Step 4.

Figure 4:
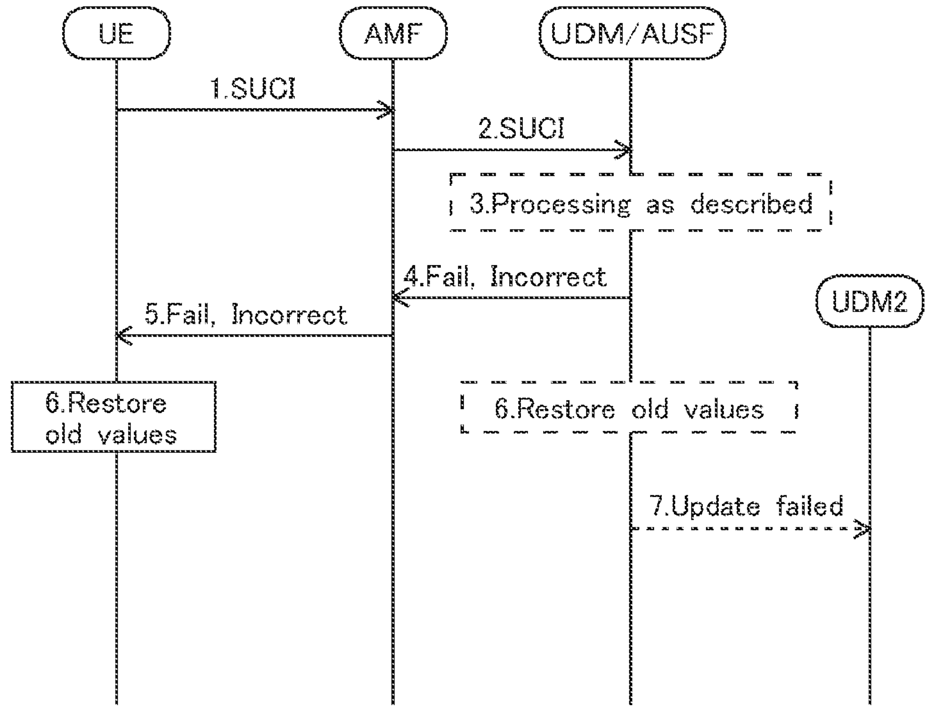
FIG. 4 is a sequence chart showing another failure handling.

FIG. 4 shows another failure handling. Steps 1-3 in FIG. 4 are the same as the steps 1-3 in FIG. 3. In steps 4 and 5, however, the UDM indicates a failure to the UE and sends this failure via the AMF to the UE. Upon reception, the UE will delete the new keys and restore the old values in Step 6. Also, the UDM will restore the old values in Step 6. The UDM may inform a second UDM (UDM2) that the update at the UE side has failed and that the subscription cannot be transferred in Step 7, in a case in which the subscription is transferred between the UDM and the UDM2. As a result of this procedure, the UE and the UDM revert both back to the original state, allowing the UE to get access using the old values a next time.

Figure 5:
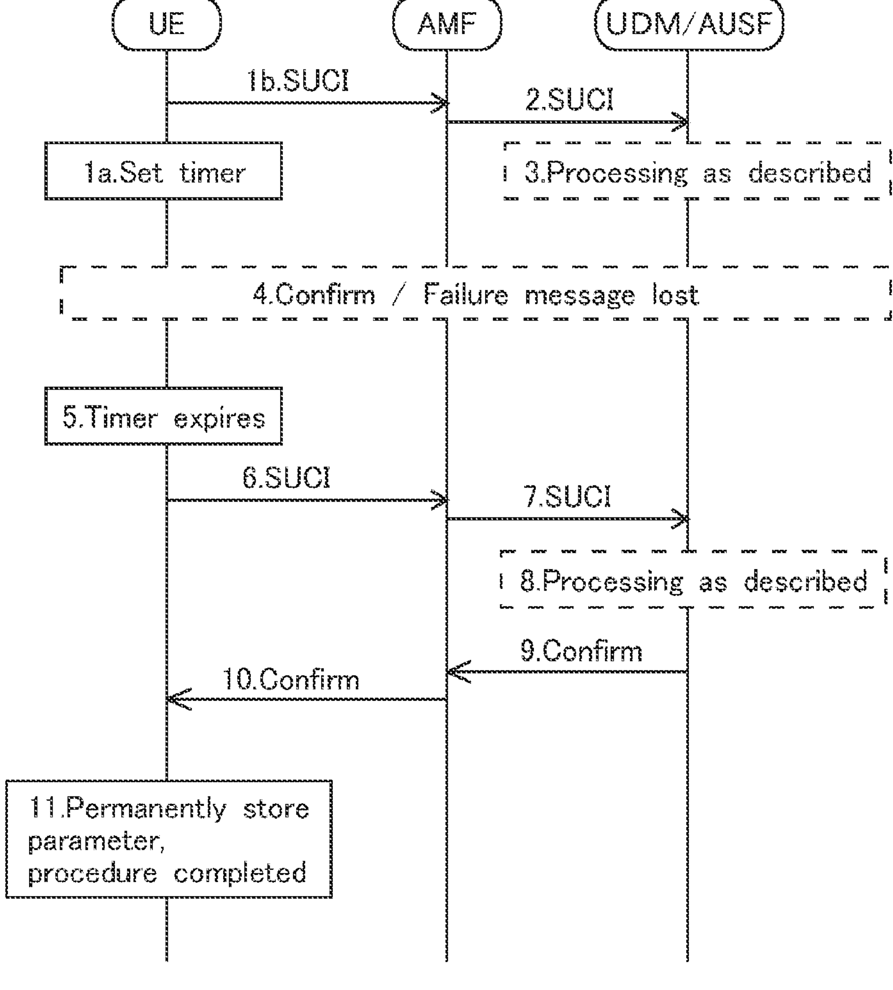
FIG. 5 is a sequence chart showing a way to handle another failure case.

FIG. 5 shows a way to handle another failure case. Another failure case is the one where the confirmation or failure message from the UDM to the UE gets lost in transit. Steps 1-3 in FIG. 5 are almost the same as the Steps 1-3 in FIG. 3. The difference is that, in Step 1*a*, the UE sets a wait timer saying how long the will wait for the UDM's confirmation message or failure message after sending the "attach parameter update confirmation message". In Step 4, the UDM may indicate a failure or confirmation to the UE and attempt to send this message to the UE. On the way from the UDM to the UE, the message may get lost, e.g. on the air interface. In Step 5, the timer at the UE-side expires and so the UE sends a new "attach parameter update confirmation" message to the UDM via the AMF in Steps 6 and 7. Again, the UDM will process as described earlier and send a confirmation or failure message back. If the message is correctly received by the UE, the UE will permanently store the new attach parameter and consider the procedure completed in Step 11.

Figure 6:
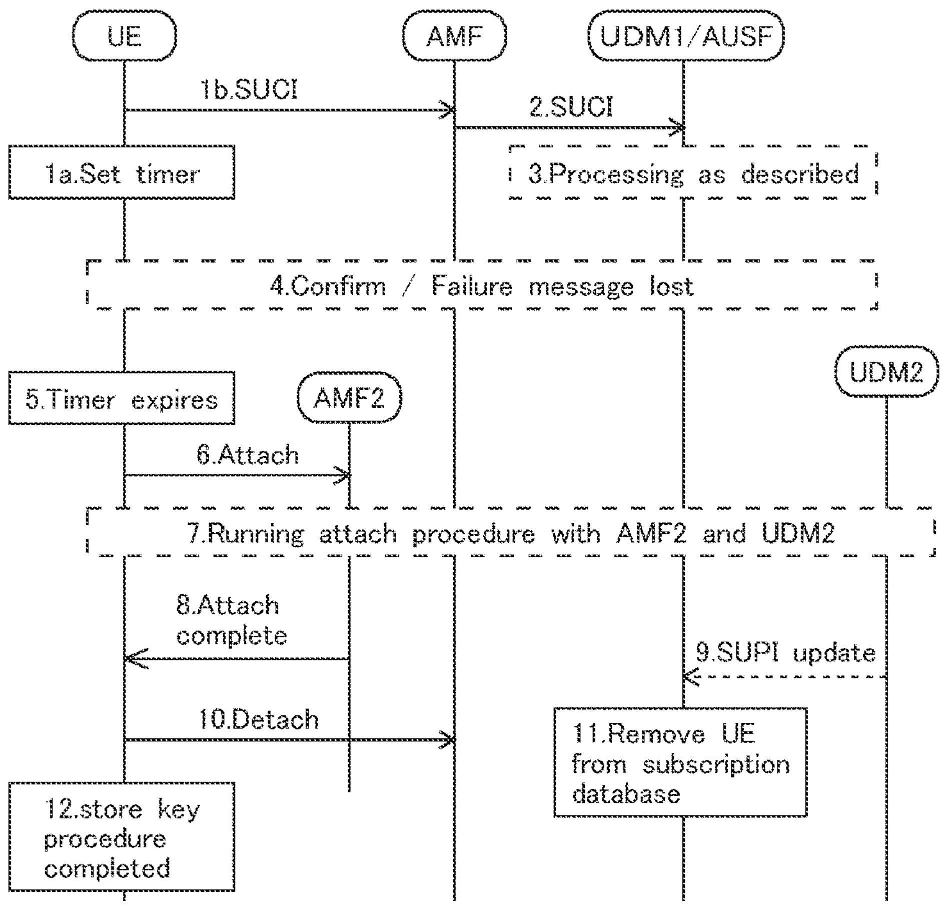
FIG. 6 is a sequence chart showing a recovery procedure with new attach.

FIG. 6 shows a recovery procedure with new attach. Steps 1-3 in FIG. 6 correspond to Steps 1-3 in FIG. 5. In Step 4, the confirmation or failure message is lost and the UE timer expires in Step 5. In the case of FIG. 6, the UE will confirm the new SUCI using an attach procedure. In order to do so, the UE initiates a new attach procedure in Step 6. For example, the UE could attach to the same network again or could attach to another network (in a case in which the UE is roaming). In Step 7, the normal attach procedure is run and as part of this attach procedure, the UE sends the SUCI to the UDM. If successful, the attach results in an "attach complete" message sent from the AMF2 back to the UE in Step 8. In a case in which the UE does not receive this attach complete or receives an error message, the UE will assume that the new attach related parameters are faulty and revert back to the original parameters.

On the home network side, the UDM2, after having de-concealed the SUCI, could inform the UDM1 that, for a certain subscriber (indicated by the SUPI), a correct SUCI was received in Step 9. This would indicate to the UDM1 that the transfer of subscription as successful and the UDM1 can delete the corresponding subscription from memory in Step 11.

In Step 10, the UE detaches from the network that it was attached to. Step 10 could also have been performed prior to Step 6 to avoid dual registration to the network. The downside of doing Step 10 earlier is that the UE would experience downtime which could hamper user experience. In Step 12, the UE takes the new material into use and stores it permanently. The UE could also remove the old attach critical parameters.

Second Embodiment

Figure 7:
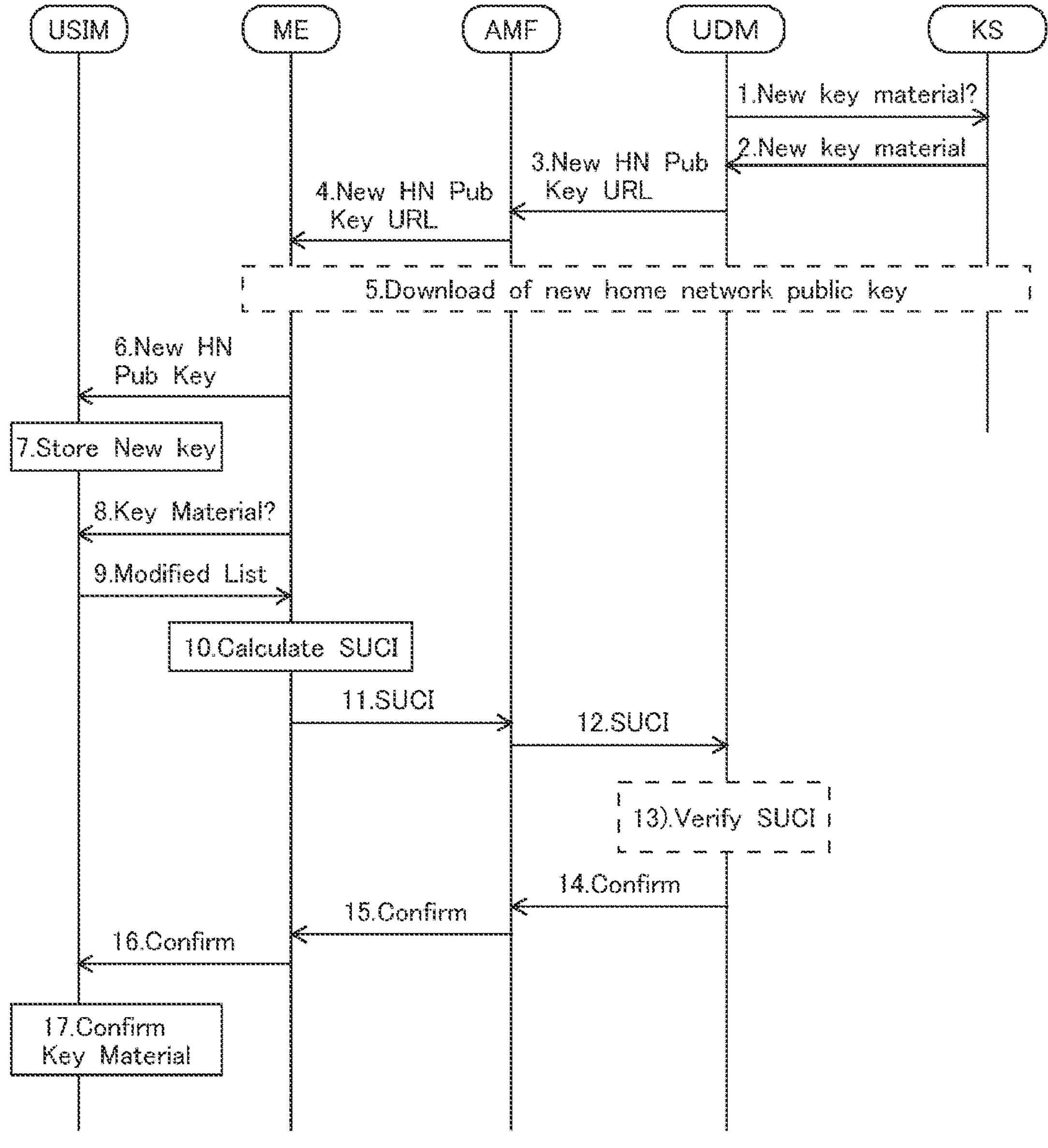
FIG. 7 is a sequence chart showing a method for confirming the correctness of the parameters after the parameters have been updated according to a second embodiment of the present disclosure.

FIG. 7 shows a method for confirming the correctness of the attach related parameters, such as a home network public key, after these parameters have been updated according to a second embodiment of the present disclosure. FIG. 7 uses a home network public key as an example, but the methods equally can be applied after an update of the RoutingID, protection scheme, etc. In the following description, the home network public key is understood to only be an example of any of these parameters. If differences with other parameters arise, they are indicated in the text.

In the method shown in FIG. 7, the UDM obtains a new home network public key from a key server (KS) in the network. In Step 1, the UDM requests the KS for new key material. In Step 2, the KS provides the new key material to the UDM. Optionally, Step 1 can be skipped and the UDM can be triggered to send new key material to the UE by receiving a new key material message from the KS. Alternatively, new key material is not provided directly to the UDM, but only a uniform resource locator (URL) for downloading new key material is provided to the UDM by the KS. For the remainder of the description, it is assumed that the KS has provided a URL for the UE to download the new key material.

After receiving the new key material or the URL for the new key material from the KS, the UDM sends a message to the UE including a ME and a USIM, via the AMF in the serving network. In Step 3, the UDM can send this message to the AMF using the SDM_Get_Response message in response to the AMF's Nudm_SDM_Get request if the UDM would like to send this message during registration of the UE. In Step 3, the UDM can send this message to the AMF using the SDM_UpdateNotification if the UDM needs to send the message after registration procedure of the UE has completed. The message that the UDM sends may contain the key material directly or may contain an instruction for the UE to start a download of the key material including a URL for the download. Using the method described in NPL2 and in FIG. 17, this message can be protected between the AUSF and the ME, so that the ME can verify that the message came from a legitimate source (not shown).

When the AMF receives the message, the AMF will forward the received message to the UE using the DL NAS transport message in order to deliver the message to the UE in Step 4. Upon reception of this message, the ME verifies the integrity of the message, according to NPL2 or the description of FIG. 17. If the integrity is correct, the UE proceeds with downloading the new key material from the indicated URL in Step 5. As a person skilled in the art will know, the URL may include the protocol to be used, such as hypertext transfer protocol (HTTP) or file transfer protocol (FTP) for unsecured protocols and hypertext transfer protocol secure (HTTPS) or secure shell (SSH) file transfer protocol (SFTP) for secured protocols. An example of such an unsecured web address is http://key-server.operator.3gpp/key_download/new_key. An example of such a secured web address is https://key-server.operator.3gpp.org/key_download/new_key.

The download of the key material can either be performed by the ME or by the USIM. If the ME performs the download in Step 5, the ME will contact the server, download the new key, and store it temporarily in memory. Hereafter, the ME will send the new key to the USIM for storage in Step 6.

Figures 8, 9:
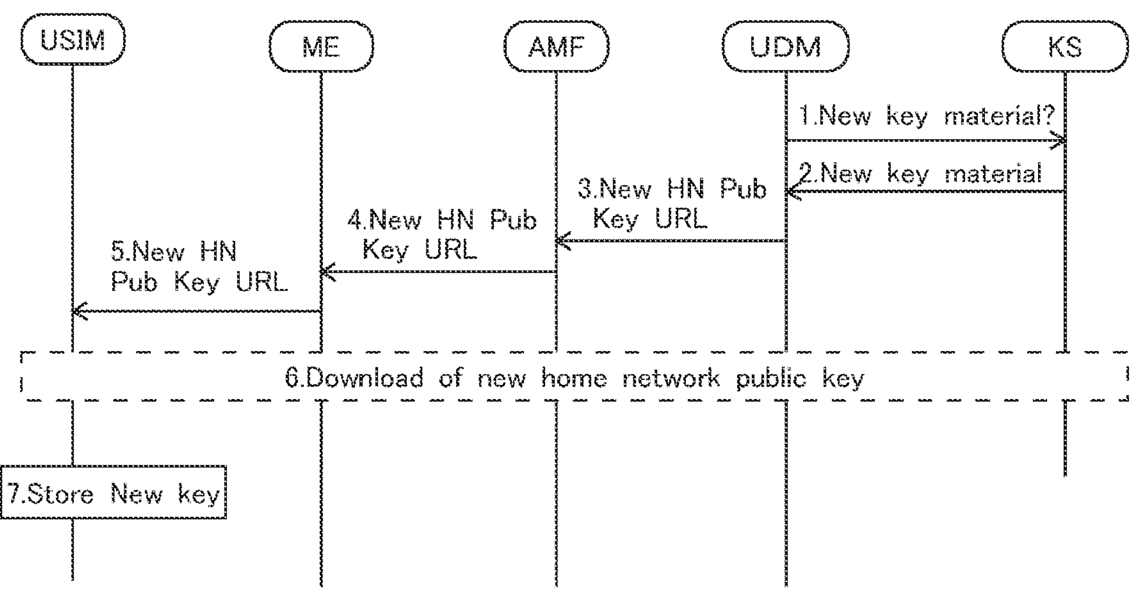
FIG. 8 is a sequence chart showing a portion of a method for confirming the correctness of the parameters.
FIG. 9 is a diagram showing an example of a content of the USIM.

FIG. 8 shows a portion of a method for confirming the correctness of the attach related parameters. Steps 1 to 4 in FIG. 8 may be the same as those in FIG. 7. If the USIM performs the download the ME sends, to the USIM, the URL included in the message received from the AMF in Step 5. The USIM receives a download trigger from the ME and starts the download in Step 6. The difference between FIGS. 7 and 8 is only Steps 5 and 6 and a further description of FIG. 8 is therefore omitted. After downloading, the USIM directly store the key in, for example, a new file or as a new entry to a table that contains keys in Step 7.

FIG. 9 shows an example of a content of the USIM. The USIM is configured to store multiple keys in a registration represented as a table. The USIM stores the home network public key (HN Key), the HN public key ID (HN KID), the RoutingID, the protection scheme and a priority or precedence field. This is advantageous for situations where the ME calculates the SUCI because the ME will do so based on key material that the ME finds in the USIM. In order to do so, the ME obtains the registration as shown in FIG. 8, without the priority field, and goes through the list in order in which they are stored to until the ME finds a protection scheme that the ME supports. Suppose that the ME supports protection scheme 2 and the list contains keys (in order of) with protection schemes 1, 3, 2, 4, 1, 2, the ME will always pick the third entry of the table and never arrive at the sixth entry of the table. If the sixth entry contains the updated key, the ME will not select that key. Similarly, if the third entry contains a faulty key or a faulty RoutingID, the ME will never select another entry and remain locked out of service.

In a case of an update, the key would therefore normally be overwritten in place of the old key. However, if the new key is somehow faulty or its associated parameters, such as RoutingID, HN KID or protection scheme are faulty, the UE will not be able to get service. In order to overcome this problem, one could append an entry to the USIM, but that would mean that the ME would never use this key. By adding a priority parameter, this problem can be overcome as follows.

Referring back to FIG. 7, once the key has been downloaded and stored according to Steps 5 and 7, the key has been assigned a priority parameter by the USIM that is lower than the priority parameter of the existing key with the same protection scheme in Step 6.

In Step 8, the key verification or attach parameter confirmation process starts. In order to do so, the ME requests the list of public keys from the USIM in Step 8. The USIM now presents a modified list in Step 9, where it has replaced the high priority entry of the home network public key with the new, lower priority entry of the public key, such that the recently updated key comes first in the list. Alternatively, the USIM may only present the newly updated key to the ME in order to enforce that the ME picks the new key for SUCI calculation. The ME calculates the SUCI in Step 10 and sends the USC1 to the network (AMF) using an attach parameter confirmation message in Step 11. In FIG. 7, this message is, for example, a NAS UL transport message where the ME includes the new calculated SUCI. The message sent in Step 11 could be carried inside a Nudm_SDM_Info message. The AMF forwards the SUCI to the UDM in Step 12. Upon reception of the SUCI, in Step 13, the UDM will proceed to verify the SUCI as described in FIG. 1 and notify the UE whether it is correct according to Steps 14-16. The USIM confirms the key material in Step 17.

Figure 18:
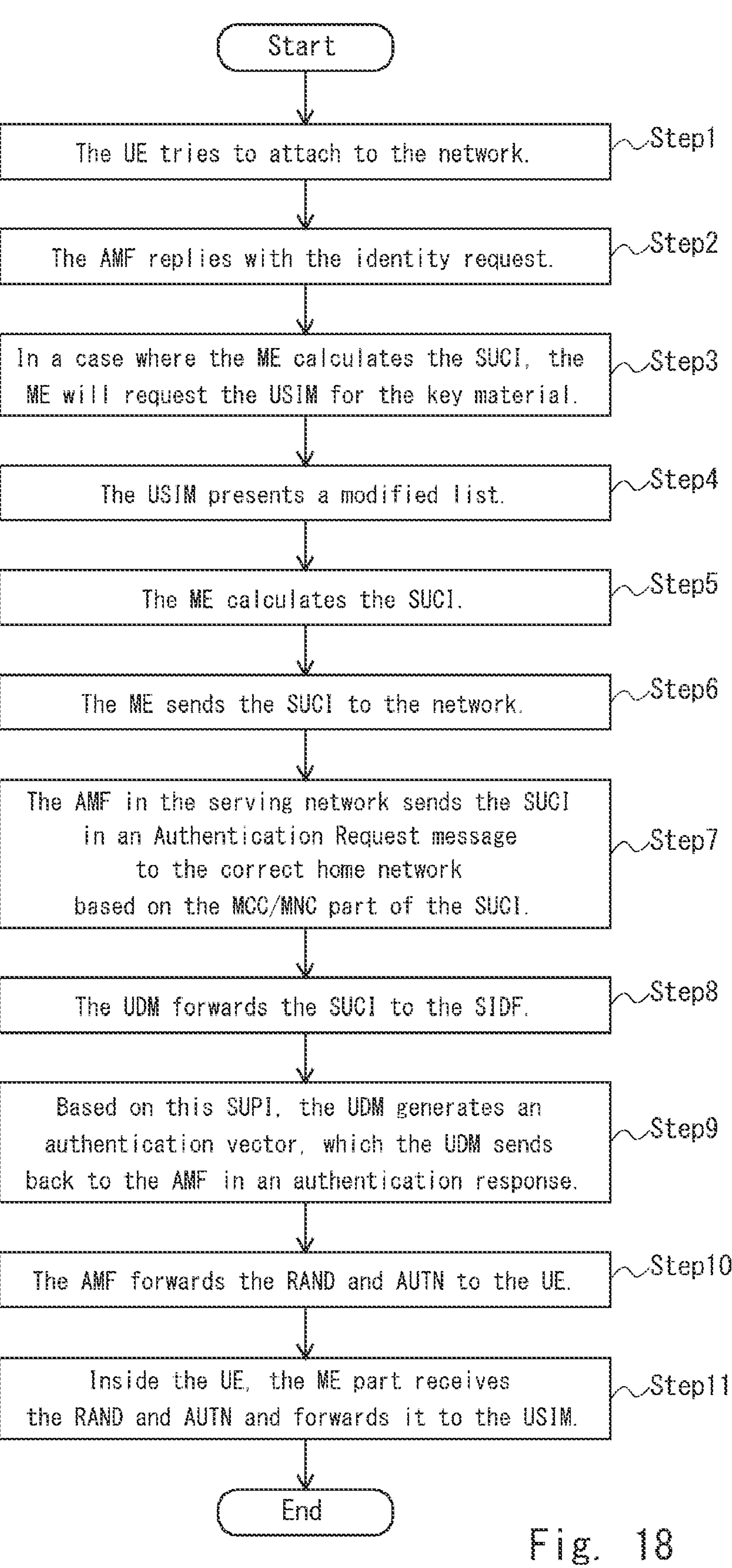
FIG. 18 is a flow chart showing another method for confirming the correctness of the parameters according to a second embodiment of the present disclosure.

In another example, depicted in FIG. 18, the key verification procedure is triggered another way. In FIG. 18, the UE has performed the attach parameter update and has subsequently detached from the network. This detaching could be the result of a configuration in the UE where detaching is necessary always after updating these parameters or could be the result of a detach message from the network. At some later time, the UE tries to attach to the network in Step 1 and sends an attach message to the AMF. The AMF replies with the identity request in Step 2. In a case where the ME calculates the SUCI, the ME will request the USIM for the key material in Step 3. The USIM now presents a modified list in Step 4, where it has replaced the high priority entry of the home network public key with the new, lower priority entry of the public key, such that the recently updated key comes first in the list. Alternatively, the USIM may only present the newly updated key to the ME in order to enforce that the ME picks the new key for SUCI calculation. The ME calculates the SUCI in Step 5 and sends the SUCI to the network in Step 6.

The AMF in the serving network will send the SUCI in an Authentication Request message to the correct home network based on the MCC/MNC part of the SUCI in Step 7 and subsequently, the home network will select the UDM based on the RoutingID. The UDM will forward the SUCI to the SIDF in Step 8, which will decrypt the SUCI and send the SUPI back to the UDM.

Based on this SUPI, the UDM will generate an authentication vector, which the UDM sends back to the AMF in an authentication response in Step 9. The AMF forwards the RAND and AUTN to the UE in Step 10 using an authentication request message. Inside the UE, the ME part will receive the RAND and AUTN and forward it to the USIM in Step 11.

When the USIM receives the RAND and AUTN, the USIM will first verify whether the AUTN is correct or not. IF the AUTN is correct, the USIM can deduct from the fact that the AUTN was received that the new key material is correct and that it leads to a UDM that holds the subscription. Subsequently, the USIM can decide to move the new key material into the higher priority place and either remove the old key material or keep the old key material and assign it a lower priority for a potential fallback position. The latter may allow the USIM to mitigate the threat where the ME has sent a SUCI encrypted with the old key material to the network, which subsequently lead the network to return a RAND and AUTN to the ME. If the USIM keeps the old keys, but with a lower priority, it can wait for an explicit signal from the UDM that the new key material has been used and so that the old key material can be removed.

In a case where the USIM did not receive a RAND and AUTN or did not receive a correct AUTN, the USIM may conclude that the new key material may be incorrect. As such, the USIM keeps the old key material in the higher priority in order to make sure that the UE can get access again based on the old, but correct key material. Once access is obtained, the UDM could observe that the old key material is used and could start a recovery procedure with the UE.

Additionally, the AUTN, which includes the sequence number, the AMF bits and a MAC (AUTN=SQN*AK||AMF||MAC) may be used by the UDM to signal that a SUCI encrypted with a new key or a SUCI with a new RoutingID was received correctly. The UDM may do so by either setting an AMF bit, or by setting the SQN to zero when the subscription was moved between two UDMs. This would be a confirmation for the USIM that the new attach critical parameters are correct. Therefore, the USIM could delete the message.

Third Embodiment

Figure 10:
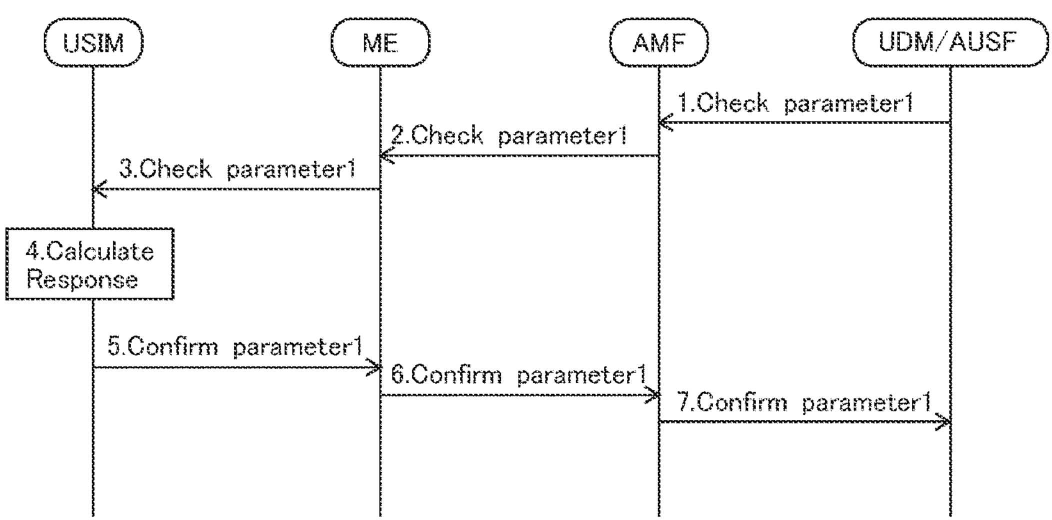
FIG. 10 is a sequence chart showing a method for confirming the correctness of the parameters after the parameters have been updated according to a third embodiment of the present disclosure.

FIG. 10 shows a method for confirming the correctness of the attach related parameters, such as home network public key, after these parameters have been updated according to a third embodiment of the present disclosure. FIG. 10 uses home network public key as an example, but the methods equally can be applied after an update of the RoutingID, protection scheme, etc. In the following description, home network public key is understood to only be an example of any of these parameters. If differences with other parameters arise, they are indicated in the text.

The method in FIG. 10 assumes that critical attach related parameter have been updated some time in the past. The UDM wishes to verify whether a specific parameter (parameter1) in the USIM is correct or not. In order to do so, the UDM sends a "check attach parameter" message including the parameter to check to the AMF in Step 1. The check attach parameter message is optionally protected according to the FIG. 17. In Step 2, the AMF forwards the check attach parameter message, e.g. using a NAS DL transport, to the ME. The ME forwards the check attach parameter message to the USIM in Step 3. Upon reception, the USIM calculates a response in Step 4, returns the response to the ME in Step 5. The ME forwards the response to the AMF in Step 6. The AMF sends the response back to the UDM in Step 7, which can do the verification.

The response of the USIM can be calculated in multiple ways:

1. In a case where the USIM is the part of the ME calculating the SUCI, the response can be the encrypted representation of the requested parameter. The encryption could then be done using the HN public key. The UDM would then verify the value by decrypting it by sending it to the SIDF and compare the plain text values.
2. The response can be the parameter itself. In this case, the ME may encrypt the parameter with the HN public key and include the encrypted representation of the parameter in Step 6. The verification method by the UDM would be the same.
3. The check parameter message from the UDM could include a RAND and AUTN of an authentication vector. The USIM could calculate the RES, verify the AUTN and if all correct, could return an encrypted representation of the parameter by applying a XOR operation between the RES and the parameter or between the AK (Anonimity key) and the parameter requested. At the UDM-side the same XOR would be performed and the plan text parameter would be obtained again for comparison purposes.

The above is particularly useful when the USIM is configured to store multiple sets of attach critical parameters with a different priority as shown in FIG. 9. In such a case, the UDM could first verify the parameters and if correct, instruct the USIM to change the priorities of the parameters such that the new attach critical parameters become the first ones as described below.

Figure 11:
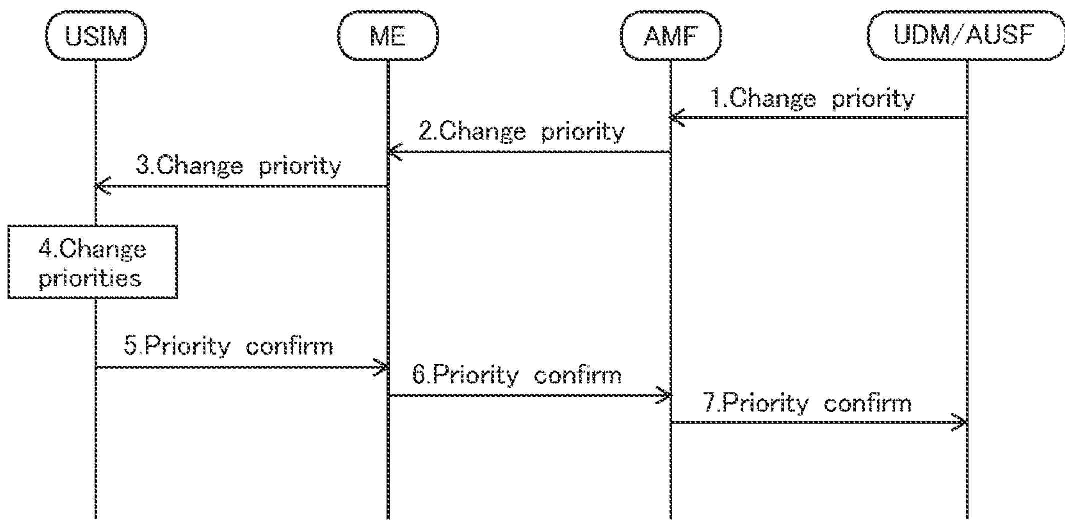
FIG. 11 is a sequence chart showing a procedure for changing priorities of parameters.

FIG. 11 shows a procedure for changing priorities of attach critical parameters. In Step 1, the UDM sends a "change priority of attach parameter" message to the AMF that contains the priorities to change. For example, the change priority of attach parameter message could contain a prioritized list of the key identities to change priorities of or it could contain the key identifier of the key that should get the highest priority in the USIM. In Step 2, the AMF forwards the change priority of attach parameter message, e.g. using a NAS DL transport, to the ME. The ME forwards the change priority of attach parameter message to the USIM in Step 3. Upon reception, the USIM would rearrange the priorities in Step 4. The USIM would return a confirmation to the ME in Step 5. The ME forwards the confirmation to the AMF in Step 6. The AMF sends confirmation back to the UDM in Step 7.

Figure 12:
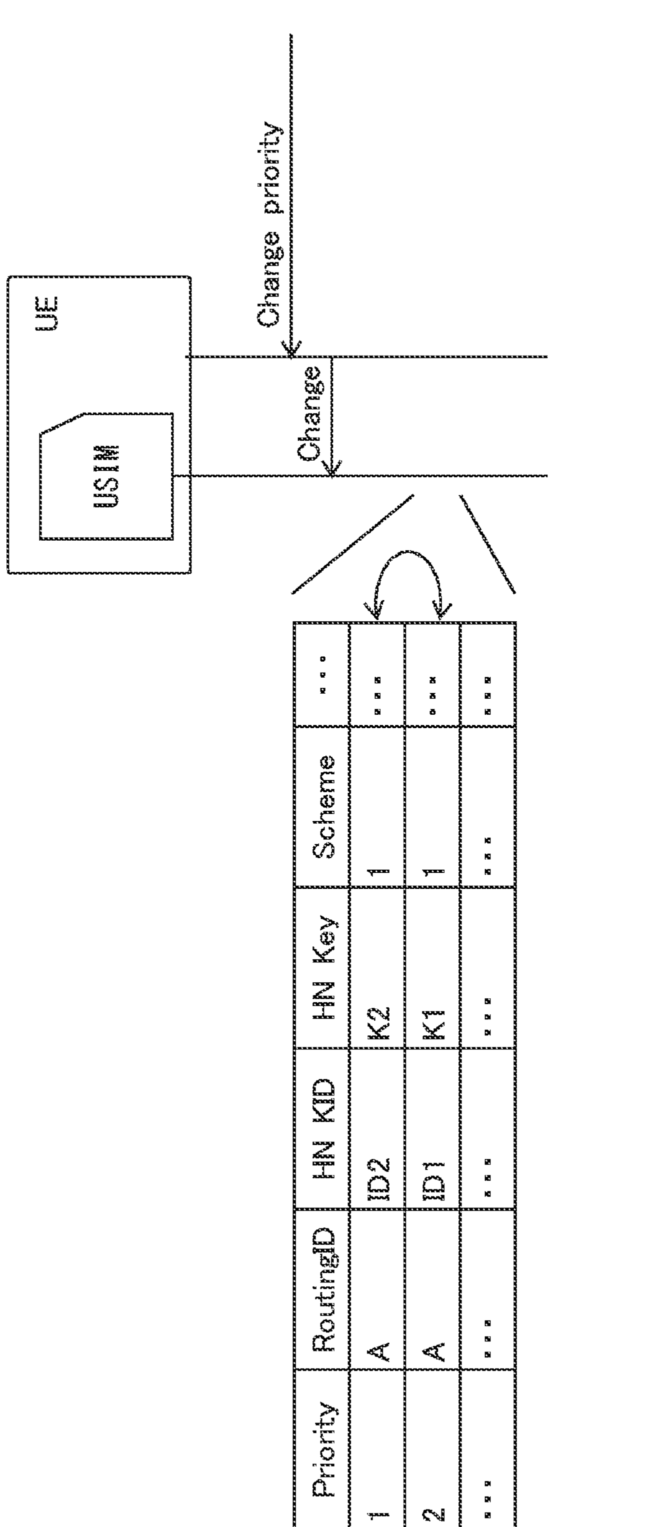
FIG. 12 is a diagram showing a table in the USIM after the priority has been changed.

FIG. 12 shows a table in the USIM after the priority has been changed. The effects of message in Step 3 and Step 4 can be explained as below. Here, the UE (which is a combination of the ME and the USIM) receives a change priorities message according to Step 2 in FIG. 11. The ME forwards the priority change message to the USIM which rearranges the keys according to the table shown in FIG. 12. As described before, this rearrangement can be permanent, but can also be temporary. In the temporary case, the table in FIG. 12 represents the table as the USIM would present to the ME upon the next request for key material. In the permanent case, the table in FIG. 12 represents the internal storage of the ME.

The advantage of a priority based approach is that the UDM can first verify the correctness of the parameter and then effectively change the order in which they are presented to the ME for calculation or the order in which they are used by the USIM for calculation. By verifying first, a fallback is much less likely to be necessary.

Another Embodiment

The User Equipment (or "UE", "mobile station", "mobile device" or "wireless device") in the present disclosure is an entity connected to a network via a wireless interface.

It should be noted that the UE in the present disclosure is not limited to a dedicated communication device, and can be applied to any device, having a communication function as a UE described in the present disclosure, as explained in the following paragraphs.

The terms "User Equipment" or "UE" (as the term is used by 3 GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "Internet of Things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may include automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine-type communication applications.

TABLE 1

Some examples of machine-type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch exchange) system, a PHS (Personal Handy-phone System)/ Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VOLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present disclosure. Needless to say, these technical ideas and embodiments are not limited to the above-described UE and various modifications can be made thereto.

User Equipment (UE)

Figure 13:
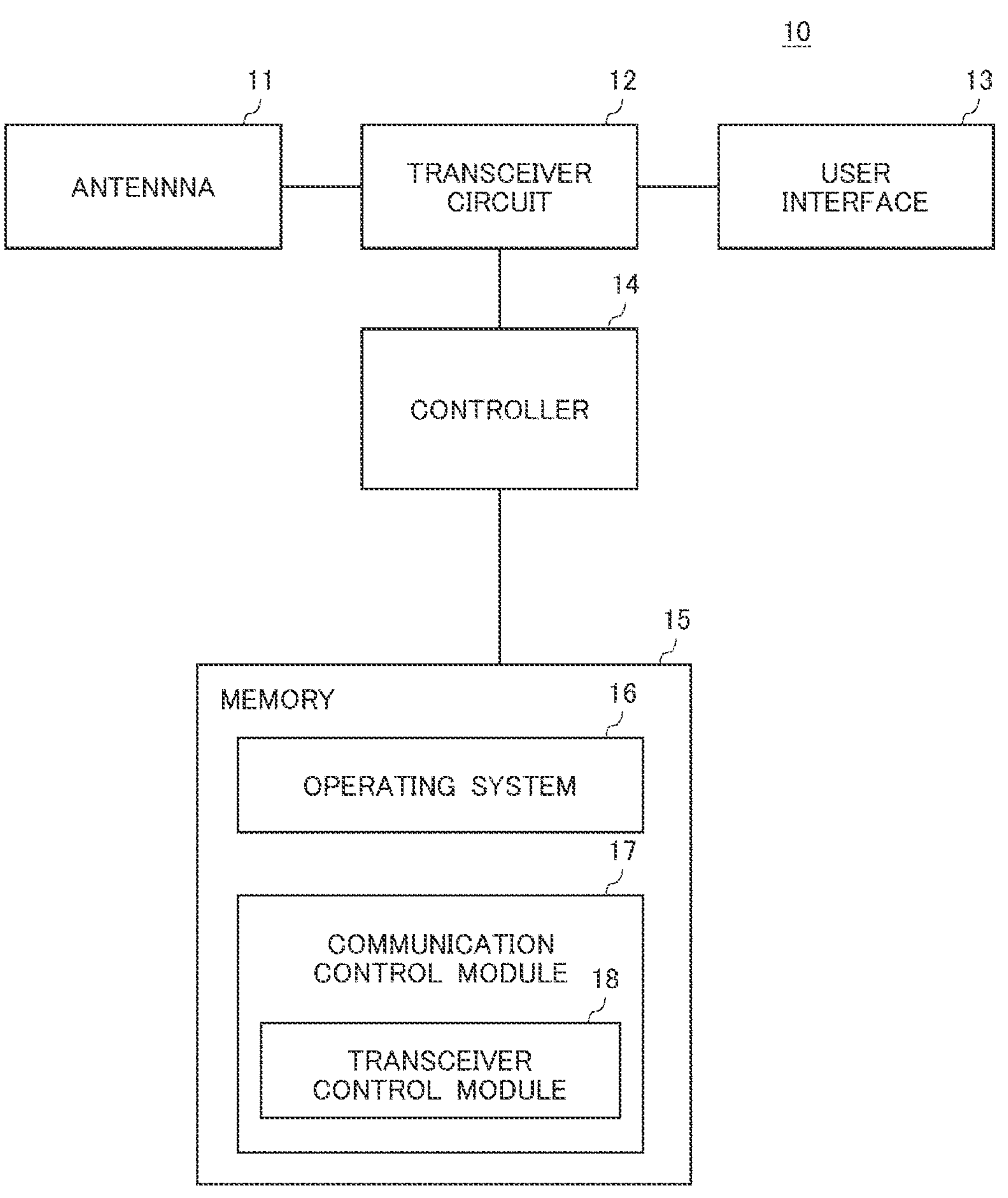
FIG. 13 is a block diagram illustrating the main components of a UE.

FIG. 13 is a block diagram illustrating the main components of a UE according to an embodiment of the present disclosure. As shown, the UE 10 includes a transceiver circuit 12 which is operable to transmit signals to and to receive signals from the connected node(s) via one or more antenna 11. Although not necessarily shown in FIG. 13, the UE will of course have all the usual functionality of a conventional mobile device (such as a user interface 13) and this may be provided by any one or any combination of hardware, software and firmware, as appropriate. Software may be pre-installed in a memory 15 and/or may be downloaded via the telecommunication network or from a removable data storage device (RMD), for example.

A controller 14 controls the operation of the UE 10 in accordance with software stored in the memory 15. For example, the controller 14 may be realized by Central Processing Unit (CPU). The software includes, among other things, an operating system 16 and a communications control module 17 having at least a transceiver control module 18. The communications control module 18 (using its transceiver control sub-module) is responsible for handling (generating/sending/receiving) signalling and uplink/downlink data packets between the UE 10 and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 14:
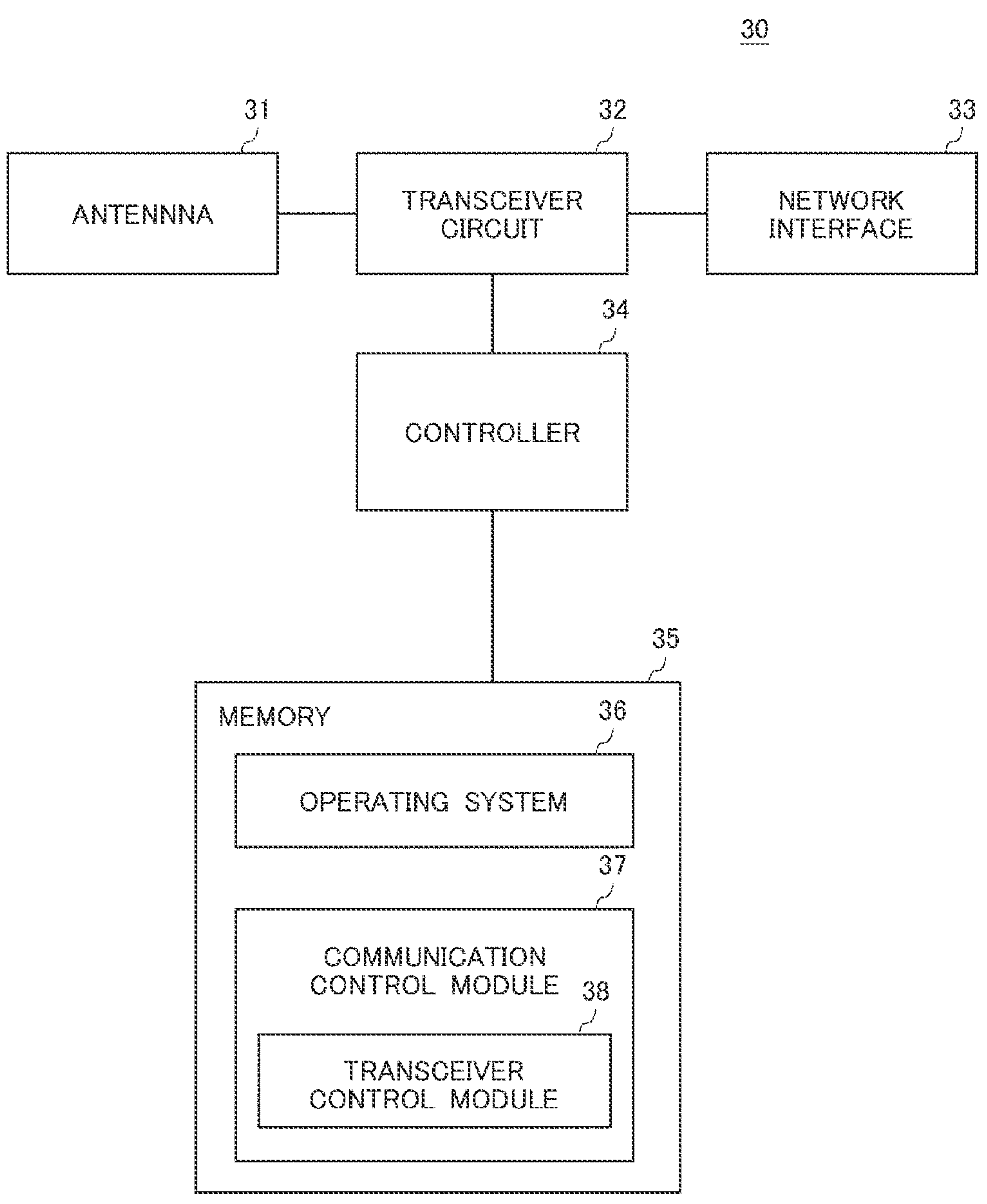
FIG. 14 a block diagram illustrating the main components of an exemplary (R)AN node.

FIG. 14 a block diagram illustrating the main components of an exemplary (R)AN node, for example a base station ('eNB' in LTE, 'gNB' in 5G) according to an embodiment of the present disclosure. As shown, the (R)AN node 30 includes a transceiver circuit 32 which is operable to transmit signals to and to receive signals from connected UE(s) via one or more antenna 31 and to transmit signals to and to receive signals from other network nodes (either directly or indirectly) via a network interface 33. A controller 34 controls the operation of the (R)AN node 30 in accordance with software stored in a memory 35. For example, the controller 34 may be realized by Central Processing Unit (CPU). Software may be pre-installed in the memory 35 and/or may be downloaded via the telecommunication network or from a removable data storage device (RMD), for example. The software includes, among other things, an operating system 36 and a communications control module 37 having at least a transceiver control module 38.

The communications control module 37 (using its transceiver control sub-module) is responsible for handling (generating/sending/receiving) signalling between the (R)AN node 30 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller 34 is also configured (by software or hardware) to handle related tasks such as, when implemented, UE mobility estimate and/or moving trajectory estimation.

Core Network Node

Figure 15:
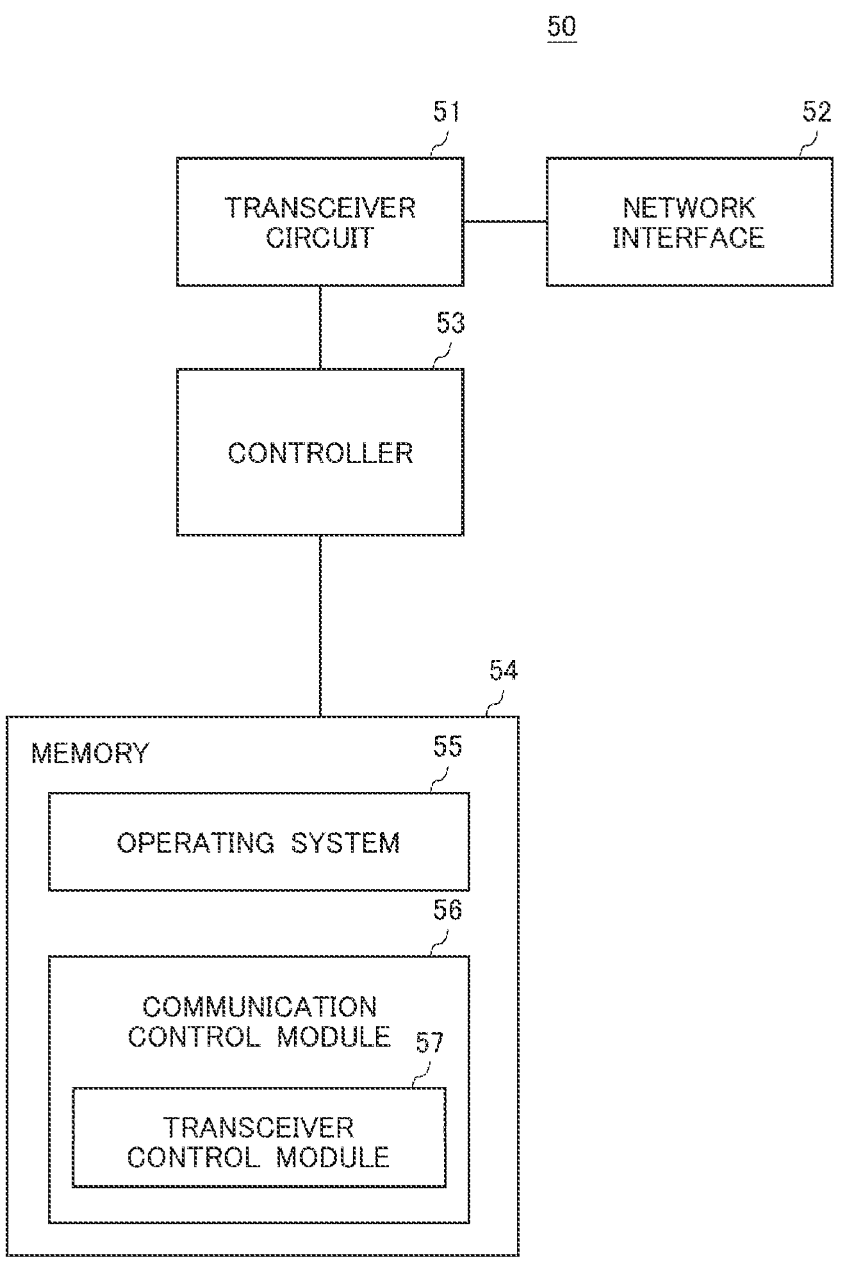
FIG. 15 a block diagram illustrating the main components of an exemplary core network node.

FIG. 15 a block diagram illustrating the main components of an exemplary core network node, for example an AMF, a SEAF, an AUSF, a KS, a UDM or any other core network node according to an embodiment of the present disclosure.

The AMF may be an alternative to the SEAF. The AUSF may be an alternative to the UDM. The core network node 50 is included in the 5GC. As shown, the core network node 50 includes a transceiver circuit 51 which is operable to transmit signals to and to receive signals from other nodes (including the UE) via a network interface 52. A controller 53 controls the operation of the core network node 50 in accordance with software stored in a memory 54. For example, the controller 53 may be realized by Central Processing Unit (CPU). Software may be pre-installed in the memory 54 and/or may be downloaded via the telecommunication network or from a removable data storage device (RMD), for example. The software includes, among other things, an operating system 55 and a communications control module 56 having at least a transceiver control module 57.

The communications control module 56 (using its transceiver control sub-module) is responsible for handling (generating/sending/receiving) signalling between the core network node 50 and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

For example, all or some of the embodiments disclosed above can be described like in, but not limited to, the following supplementary notes.

(Supplementary Note 1)

An apparatus comprising:

a memory storing one or more instructions;

a processor configured to execute the one or more instructions to:

receive update information from an external apparatus, the update information corresponding to a network communication;

obtain a Subscription Concealed Identifier (SUCI) based on the update information; and transmit the SUCI to the external apparatus.

(Supplementary Note 2)

The apparatus according to Supplementary note 1, wherein the processor is further configured to obtain the SUCI by encrypting a Subscription Permanent Identifier (SUPI) based on the update information.

(Supplementary Note 3)

The apparatus according to Supplementary note 1, wherein the processor is further configured to obtain the SUCI by concatenating a Subscription Permanent Identifier (SUPI) with the update information.

(Supplementary Note 4)

The apparatus according to Supplementary note 2 or 3, wherein the processor is further configured to receive a confirmation from the external apparatus, the confirmation message being based on match between the SUPI corresponding the SUCI and another SUPI stored in association with the update information.

(Supplementary Note 5)

The apparatus according to any one of Supplementary notes 1 to 4, wherein the update information comprises at least one of a home network public key, a routing ID, a home network public key identifier, and a protection scheme in the apparatus.

(Supplementary Note 6)

An apparatus comprising:

a memory storing one or more instructions;

a processor configured to execute the one or more instructions to:

transmit update information to an external apparatus, the update information corresponding to a network communication;

receive a Subscription Concealed Identifier (SUCI) from the external apparatus, the SUCI being obtained based on the update information;

obtain a Subscription Permanent Identifier (SUPI) based on the received SUCI; and verify whether the SUPI corresponds to the update information.

(Supplementary Note 7)

The apparatus according to Supplementary note 6, wherein the SUPI is obtained by performing a Subscription Identifier De-concealing function (SIDF) on the SUCI.

(Supplementary Note 8)

The apparatus according to Supplementary note 7, wherein the processor is further configured to verify the SUPI by comparing the SUPI obtained from the SIDF with another SUPI stored in association with the update information.

(Supplementary Note 9)

The apparatus according to Supplementary note 8, wherein the processor is further configured to transmit a confirmation to the external apparatus based on match between the SUPI obtained from the SIDF and another SUPI stored in association with the update information.

(Supplementary Note 10)

The apparatus according to any one of Supplementary notes 6 to 9, wherein the update information comprises at least one of a home network public key, a routing ID, a home network public key identifier, and a protection scheme in the apparatus.

(Supplementary Note 11)

A method comprising:

receiving update information from an external apparatus, the update information corresponding to a network communication;

obtaining a Subscription Concealed Identifier (SUCI) based on the update information; and transmitting the SUCI to the external apparatus.

(Supplementary Note 12)

The method according to Supplementary note 11, wherein the SUC1 is obtained by encrypting a Subscription Permanent Identifier (SUPI) based on the update information.

(Supplementary Note 13)

The method according to Supplementary note 11, wherein the SUCI is obtained by concatenating a Subscription Permanent Identifier (SUPI) with the update information.

(Supplementary Note 14)

The method according to Supplementary note 12 or 13 further configured to:

receiving a confirmation from the external apparatus, the confirmation message being based on match between the SUPI corresponding the SUCI and another SUPI stored in association with the update information.

(Supplementary Note 15)

The method according to any one of Supplementary notes 11 to 14, wherein the update information comprises at least one of a home network public key, a routing ID, a home network public key identifier, and a protection scheme in the apparatus.

(Supplementary Note 16)

A method comprising:

transmitting update information to an external apparatus, the update information corresponding to a network communication;

receiving a Subscription Concealed Identifier (SUCI) from the external apparatus, the SUCI being obtained based on the update information;

obtaining a Subscription Permanent Identifier (SUPI) based on the received SUCI; and verifying whether the SUPI corresponds to the update information.

(Supplementary Note 17)

The method according to Supplementary note 16, wherein the SUPI is obtained by performing a Subscription Identifier De-concealing function (SIDF) on the SUCI.

(Supplementary Note 18)

The method according to Supplementary note 17 further configured to:

verifying the SUPI by comparing the SUPI obtained from the SIDF with another SUPI stored in association with the update information.

(Supplementary Note 19)

The method according to Supplementary note 18 further configured to:

transmitting a confirmation to the external apparatus based on match between the SUPI obtained from the SIDF and the SUPI stored in association with the update information.

(Supplementary Note 20)

The method according to any one of Supplementary notes 16 to 19, wherein the update information comprises at least one of a home network public key, a routing ID, a home network public key identifier, or a protection scheme in the apparatus.

This application is based upon and claims the benefit of priority from Indian patent applications No. 201811041964, filed on Nov. 6, 2018, the disclosure of which is incorporated herein in its entirety by reference.

REFERENCE SIGNS LIST

10 UE
11 ANTENNA
12 TRANSCEIVER CIRCUIT
13 USER INTERFACE
14 CONTROLLER
15 MEMORY
16 OPERATING SYSTEM
17 COMMUNICATIONS CONTROL MODULE
18 TRANSCEIVER CONTROL MODULE
30 (R)AN NODE
31 ANTENNA
32 TRANSCEIVER CIRCUIT
33 NETWORK INTERFACE
34 CONTROLLER
35 MEMORY
36 OPERATING SYSTEM
37 COMMUNICATIONS CONTROL MODULE
38 TRANSCEIVER CONTROL MODULE
50 CORE NETWORK NODE
51 TRANSCEIVER CIRCUIT
52 NETWORK INTERFACE
53 CONTROLLER
54 MEMORY
55 OPERATING SYSTEM
56 COMMUNICATIONS CONTROL MODULE
57 TRANSCEIVER CONTROL MODULE

The invention claimed is:

1. A method of a user equipment (UE) comprising:

receiving one or more updated parameters for the UE from a core network apparatus;

verifying a first Message Authentication Code for Integrity (MAC-I) relevant to the one or more updated parameters, wherein the first MAC-I is generated using a Key Derivation Function (KDF) and a first input;

generating a second MAC-I, different from the first MAC-I, using a KDF and a second input in a case where the first MAC-I is verified successfully, wherein the second input is different from the first input; and transmitting a message including the second MAC-I to the core network apparatus.

2. The method according to claim 1 further comprising:

obtaining a Subscription Concealed Identifier (SUCI) by concatenating a concealed Subscription Permanent Identifier (SUPI) and the one or more updated parameters for the UE; and transmitting further the SUCI.

3. The method according to claim 1, wherein one of the one or more updated parameters for the UE is a Routing identifier.

4. The method according to claim 1, wherein the message is an Uplink (UL) Non-Access Stratum (NAS) transport message.

5. The method according to claim 1, wherein the first MAC-I is used to protect a content of a Downlink (DL) Non-Access Stratum (NAS) transport message, and wherein the second MAC-I is used to protect a content of an Uplink (UL) NAS transport message.

6. The method according to claim 1, wherein the second input comprises at least a parameter related to the one or more updated parameters.

7. The method according to claim 1, wherein the second input comprises at least a parameter related to the one or more updated parameters, and the parameter related to the one or more updated parameters indicates acknowledgement of the one or more updated parameters.

8. The method according to claim 1, wherein the core network apparatus is an Access and Mobility Function (AMF).

9. The method according to claim 1, wherein the core network apparatus is an Access and Mobility Function (AMF), and the second input comprises at least one of a counter and a parameter related to the one or more updated parameters.

10. The method according to claim 1, wherein the core network apparatus is an Access and Mobility Function (AMF), the second input comprises at least a parameter related to the one or more updated parameters, and the parameter related to the one or more updated parameters indicates acknowledgement of the one or more updated parameters.

11. The method according to claim 1, wherein the first input comprises at least one of a counter and a first parameter related to the one or more updated parameters, the second input comprises at least a second parameter related to the one or more updated parameters, and the second parameter indicates acknowledgement of the one or more updated parameters.

12. A method of a user equipment (UE) comprising:

receiving, from a core network apparatus, a Downlink (DL) Non-Access Stratum (NAS) transport message comprising one or more updated parameters;

verifying a first Message Authentication Code for Integrity (MAC-I) generated using a Key Derivation Function (KDF) and a first input;

calculating a second MAC-I using a KDF and a second input different from the first input in a case where the first MAC-I is verified successfully; and transmitting, to the core network apparatus, an Uplink (UL) NAS transport message comprising the second MAC-I.

13. The method according to claim 12 further comprising:

obtaining a Subscription Concealed Identifier (SUCI) by concatenating a concealed Subscription Permanent Identifier (SUPI) and the one or more updated parameters for the UE; and transmitting the SUCI.

14. The method according to claim 12, wherein the second input comprises at least a parameter related to the one or more updated parameters.

15. The method according to claim 12, wherein the second input comprises at least a parameter related to the one or more updated parameters, and the parameter related to the one or more updated parameters indicates acknowledgement of the one or more updated parameters.

16. The method according to claim 12, wherein the core network apparatus is an Access and Mobility Function (AMF).

17. The method according to claim 12, wherein the core network apparatus is an Access and Mobility Function (AMF), and the second input comprises at least one of a counter and a parameter related to the one or more updated parameters.

18. The method according to claim 12, wherein the core network apparatus is an Access and Mobility Function (AMF), the second input comprises at least a parameter related to the one or more updated parameters, and the parameter related to the one or more updated parameters indicates acknowledgement of the one or more updated parameters.

19. The method according to claim 12, wherein the first input comprises at least one of a counter and a first parameter related to the one or more updated parameters, the second input comprises at least a second parameter related to the one or more updated parameters, and the second parameter indicates acknowledgement of the one or more updated parameters.

20. A user equipment (UE) comprising:

a memory storing one or more instructions; and a processor configured to execute the one or more instructions to:

receive one or more updated parameters for the UE from a core network apparatus;

verify a first Message Authentication Code for Integrity (MAC-I) relevant to the one or more updated parameters, wherein the first MAC-I is generated using a Key Derivation Function (KDF) and a first input;

generate a second MAC-I, different from the first MAC-I, using a KDF and a second input in a case where the first MAC-I is verified successfully, wherein the second input is different from the first input; and transmit a message including the second MAC-I to the core network apparatus.

21. A user equipment (UE) comprising:

a memory storing one or more instructions; and a processor configured to execute the one or more instructions to:

receive, from a core network apparatus, a Downlink (DL) Non-Access Stratum (NAS) transport message comprising one or more updated parameters;

verify a first Message Authentication Code for Integrity (MAC-I) generated using a Key Derivation Function (KDF) and a first input;

calculate a second MAC-I using a KDF and a second input different form the first input in a case where the first MAC-I is verified successfully; and transmit, to the core network apparatus, an Uplink (UL) NAS transport message comprising the second MAC-I.

* * * * *